(12) United States Patent
Chein et al.

(10) Patent No.: US 10,917,259 B1
(45) Date of Patent: Feb. 9, 2021

(54) COMPUTING DEVICE INTERACTION WITH SURROUNDING ENVIRONMENT

(71) Applicant: Amazon Technologies, Inc., Reno, NV (US)

(72) Inventors: Jason Shih Shen Chein, Bellevue, WA (US); Peter Thomas Killalea, Seattle, WA (US); Hilliard Bruce Siegel, Seattle, WA (US); Brent Russell Smith, Redmond, WA (US); Walter Manching Tseng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 14/179,978

(22) Filed: Feb. 13, 2014

(51) Int. Cl.
| H04L 12/28 | (2006.01) |
| G05B 15/02 | (2006.01) |
| F24F 120/14 | (2018.01) |
| F24F 130/40 | (2018.01) |
| F24F 130/30 | (2018.01) |
| F24F 130/20 | (2018.01) |

(52) U.S. Cl.
CPC .......... *H04L 12/2821* (2013.01); *G05B 15/02* (2013.01); *H04L 12/2829* (2013.01); *F24F 2120/14* (2018.01); *F24F 2130/20* (2018.01); *F24F 2130/30* (2018.01); *F24F 2130/40* (2018.01); *G05B 2219/2642* (2013.01); *Y04S 20/242* (2013.01)

(58) Field of Classification Search
CPC ............ G05B 15/02; G05B 2219/2614; G05B 2219/2638; G05B 2219/2642; G05B 2219/2648; F24F 2011/0035; F24F 2011/0036; F24F 2011/0057; F24F 2011/0061; F24F 2011/0067–0072; F24F 2011/0091; F24F 11/30; F24F 11/50–65; F24F 2110/00–65; F24F 2120/00–20; F24F 2130/00–40; Y04S 20/227–228; Y04S 20/242–244; Y04S 20/20; G05D 23/1931–1934; H04L 12/2803–2838; H04L 2012/284–285
USPC .......................... 700/28–37, 40, 44–55, 276
See application file for complete search history.

(56) References Cited

U.S. PATENT DOCUMENTS

| 6,754,504 B1 * | 6/2004 | Reed ...................... G06Q 50/00 455/414.1 |
| 7,412,042 B2 * | 8/2008 | Henry .................... G06Q 10/02 379/201.01 |

(Continued)

*Primary Examiner* — Todd Aguilera
(74) *Attorney, Agent, or Firm* — Lee & Hayes, P.C.

(57) ABSTRACT

In some examples, a computing device may receive an indication that a first user and a second user are located in a zone of an interior space or other surrounding environment. Settings of one or more controllable devices may be controlled based on user profiles including implicit or explicit user preferences, such as for controlling lighting, ambient temperature, entertainment, security, etc., in the zone. When there is conflict between the user preferences, the conflict may be resolved, such as by determining a hierarchy between the users, by averaging the preferred settings, or based on other techniques. Further, a portable computing device may be associated with a user and may provide sensor information. The sensor information may include biometric sensor information that is indicative of a bodily condition of the user and that can be used for determining a context of the user or the zone.

20 Claims, 8 Drawing Sheets

(56) References Cited

U.S. PATENT DOCUMENTS

| | | | | |
|---|---|---|---|---|
| 8,108,055 B2* | 1/2012 | Wong | ................. | G08G 1/04 |
| | | | | 340/937 |
| 8,280,555 B2* | 10/2012 | Masui | ................. | F24F 11/006 |
| | | | | 700/276 |
| 8,750,850 B2* | 6/2014 | Gupta | ................. | H04L 12/66 |
| | | | | 455/41.2 |
| 9,118,220 B2* | 8/2015 | Lamb | ................. | H02J 13/0086 |
| 10,001,791 B2* | 6/2018 | Lagerstedt | ................. | H04W 4/33 |
| 10,371,399 B1* | 8/2019 | Rodriguez | ................. | F24F 11/62 |
| 2004/0161097 A1* | 8/2004 | Henry | ................. | G06Q 10/02 |
| | | | | 379/266.02 |
| 2007/0297590 A1* | 12/2007 | Macbeth | ................. | G06Q 10/00 |
| | | | | 379/201.02 |
| 2009/0171478 A1* | 7/2009 | Wong | ................. | G08G 1/04 |
| | | | | 700/13 |
| 2009/0281667 A1* | 11/2009 | Masui | ................. | F24F 11/006 |
| | | | | 700/276 |
| 2010/0289643 A1* | 11/2010 | Trundle | ................. | F24F 11/0086 |
| | | | | 340/545.1 |
| 2011/0177802 A1* | 7/2011 | Gupta | ................. | H04L 12/66 |
| | | | | 455/418 |
| 2012/0072032 A1* | 3/2012 | Powell | ................. | F24F 11/30 |
| | | | | 700/278 |
| 2013/0054033 A1* | 2/2013 | Casilli | ................. | H04L 12/282 |
| | | | | 700/276 |
| 2013/0166073 A1* | 6/2013 | Pine | ................. | F24F 11/0034 |
| | | | | 700/276 |
| 2014/0006823 A1* | 1/2014 | Lamb | ................. | H02J 13/0086 |
| | | | | 713/323 |
| 2014/0207292 A1* | 7/2014 | Ramagem | ................. | G05B 15/02 |
| | | | | 700/278 |
| 2014/0222210 A1* | 8/2014 | Agarwal | ................. | G05B 15/02 |
| | | | | 700/275 |
| 2014/0309789 A1* | 10/2014 | Ricci | ................. | B60Q 1/00 |
| | | | | 700/276 |
| 2015/0168002 A1* | 6/2015 | Plitkins | ................. | F24F 11/30 |
| | | | | 165/237 |
| 2015/0369509 A1* | 12/2015 | Schwarz | ................. | H04L 67/125 |
| | | | | 700/276 |
| 2016/0077532 A1* | 3/2016 | Lagerstedt | ................. | H04M 1/72572 |
| | | | | 700/277 |

* cited by examiner

COMPUTING DEVICE INTERACTION WITH SURROUNDING ENVIRONMENT

BACKGROUND

People use computing devices for a variety of purposes, such as making telephone calls, texting, accessing the Internet, sending and receiving email, instant messaging, maintaining their calendars, viewing movies and television shows, playing music, reading electronic books, socializing, playing games, navigating, working, and numerous other functions. These computing devices have become increasingly portable and wearable, such that users may often have a computing device on or about them virtually at all times. Finding ways to enhance the lifestyle of the users of these computing devices continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
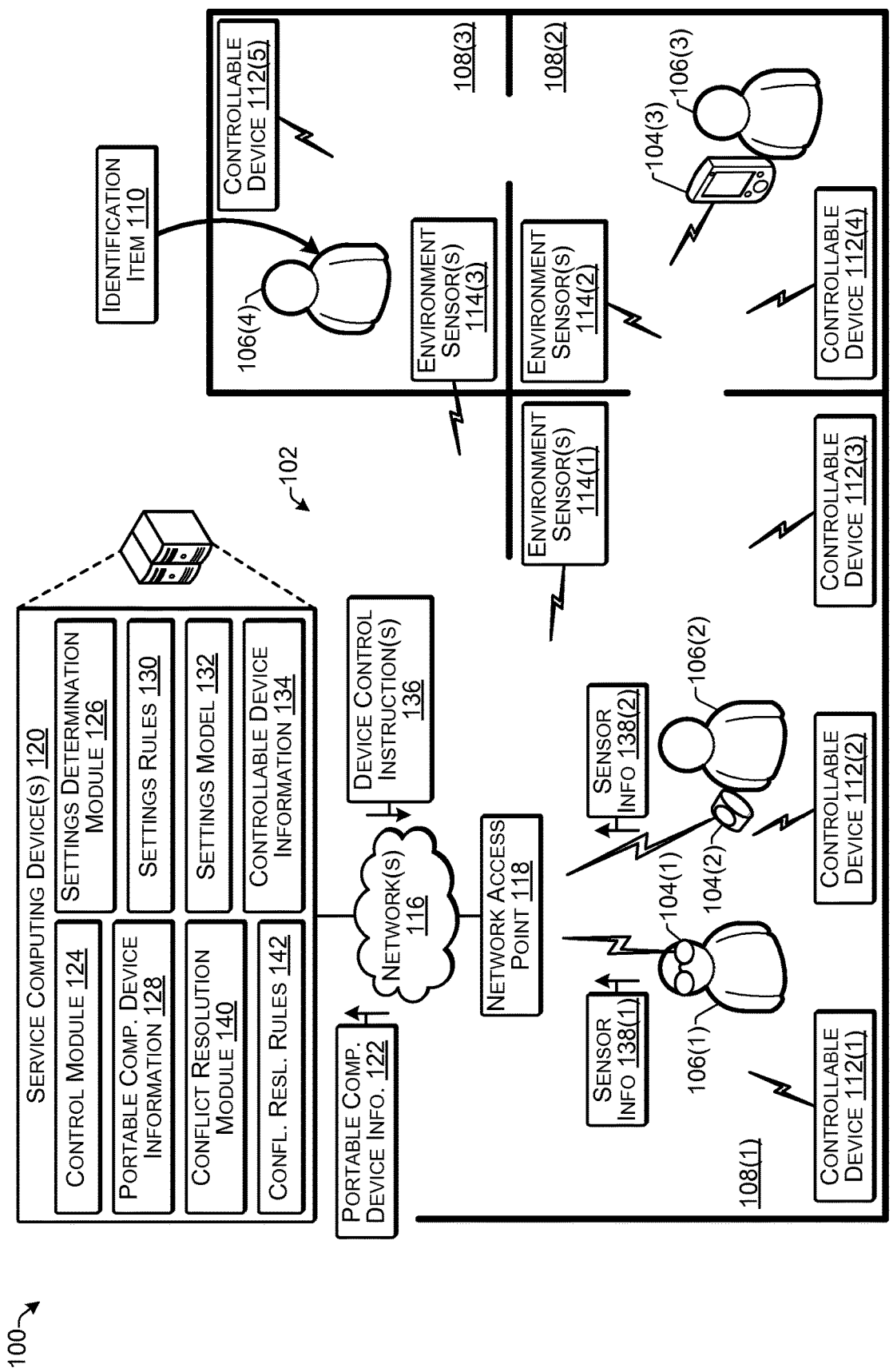
FIG. 1 illustrates an example system configured for controlling a surrounding environment based on interaction with one or more portable computing devices according to some implementations.

Some implementations herein include techniques and arrangements for enabling portable computing devices to interact with or cause a change in a surrounding environment. For instance, various aspects of the surrounding environment may be adjusted based on detection of a portable computing device as being in a particular location and/or based on receiving information from the portable computing device. Examples of environments that may be controlled include interior spaces, such as a home of a user, an office of a user, an automobile interior of the user, or any of various other locations, additional examples of which are provided further below. Furthermore, when multiple different users are in the same room or other type of zone, implementations herein may determine a priority, a compromise, or the like, when controlling the settings of the zone to attempt to accommodate all of the users currently in the zone, such as when there is a conflict between the preferred settings of two or more users. In some examples, the portable computing devices may include wearable computing devices, such as augmented reality glasses, watch-type or other strap-mounted computing devices, computing devices incorporated into articles of clothing, and so forth, as well as other types of portable computing devices such as smart phones, tablets, laptops, electronic book reader devices, and the like, additional examples of which are given below.

In some examples, detection of one or more portable computing devices in a particular location, such as within a particular zone in an interior space or other surroundings, may cause a service computing device to carry out changes to the environment of the zone. As one example, a sensor may detect that the portable computing device is in the particular location, and may communicate this information to one or more service computing devices able to send to control a controllable device associated with the location. In some cases, the one or more service computing devices may include a cloud-based or otherwise remote service computing device. Additionally, or alternatively, the one or more service computing devices may include a local service computing device, and the system might or might not include a remote computing device.

In some examples, the portable computing device itself may determine its current location and may communicate this information to the service computing device. The information communicated to the service computing device may further include sensor information, such as biometric data of the user or other sensor information, which may be used when determining any changes to the environment of the current location. When multiple portable computing devices are at the same location, there may be conflicts between explicit and/or implicit preferred settings of the associated users. For instance, the settings to be applied may be defined or determined according to respective user profiles of the users. Accordingly, in response to detecting a conflict between settings for two or more user profiles, the service computing device may apply one or more rules to resolve the conflict when determining the settings to be applied for controlling the environment. For example, dependent on the particular system or device being controlled the settings may be changed based on at least one of determining a priority, such as based on a hierarchy of the users, or determining a middle ground between two or more desired settings.

In some cases, the portable computing devices themselves may send instructions to change one or more settings in the environment. For instance, the portable computing device may determine its own current location and may communicate with one or more controllable devices associated with that location for adjusting the settings of the environment in accordance with the preferences of the user of the portable computing device. Under this scenario, when multiple portable computing devices are at the same location, the multiple portable computing devices may determine among themselves a particular portable device that will resolve a conflict in the settings to be applied to the environment.

Examples of settings of the controllable devices that may be changed to effect a change in the environment of a location may include light settings, climate control settings, entertainment system settings, security system settings, appliance settings, or settings of other controllable electronic systems. Accordingly, various aspects of the environment surrounding the users of the portable computing devices may be automatically changed based on determination that the users are currently located in a particular zone or other location. Further, sensor input may also be used to determine a current condition or other context at the location, and may be a trigger for changing the settings of the controllable devices associated with the location. For instance, a camera on a portable computing device may sense a glare on a television screen, or excessive light directed toward a user's eyes, and based on this sensed information, settings for the shades in the room may be changed so that the shades are automatically closed in response to the sensed information. Similarly, low-light areas can be detected to automatically turn on lights or open the shades when the user is in an area with insufficient lighting. For example, context information obtained from one or more sensors may indicate that the user has opened a book and requires more light for reading. Additionally, a temperature sensor on the portable computing device or in the zone can be used to control thermostat settings for a climate control system based on biometric sensor information determined by the portable computing device with respect to the user. Further, a microphone on the device can be used to detect the volume of audio currently playing in the zone, such as from a television or other entertainment system. This information may be used to adjust the volume level to conform to user-specified levels, such as based on observed previous listening habits of the user, or based on expressed preferences of the user.

In addition, a portable computing device may present a user interface to enable the user to specify custom preferences for various environmental settings. Furthermore, the portable computing devices may include various types of sensors that may be calibrated to accurately sense the environment and/or user conditions, such as when the portable computing devices are used to detect ambient temperature, ambient lighting, device location and/or biometric information representing a bodily condition of the user.

Additionally, the portable computing devices may include various types of communication interfaces, such as for close range communications (e.g., Near Field Communication (NFC), Bluetooth®, etc.), and/or other wireless communications (e.g., cellular or Wi-Fi). These communication interfaces may be used for communications with network access points, other portable computing devices, the service computing device and/or the controllable devices in the surrounding environment. Accordingly, in some examples, each portable computing device may be able to communicate with the controllable devices over a network (such as via Wi-Fi) or directly (such as through short-range communications). Alternatively, in other examples, the service computing device may communicate with the controllable devices over a network or directly based on information received from or about the portable computing devices.

For discussion purposes, some example implementations are described as including portable computing devices in a home or other interior space environment. However, the implementations herein are not limited to the particular examples provided, and may be extended to other types of devices and other types of environments, as will be apparent to those of skill in the art in light of the disclosure herein.

FIG. 1 illustrates an example system 100 for controlling a surrounding environment, such as an interior space 102, based on interaction with one or more portable computing devices according to some implementations. In this example, three portable computing devices 104 are illustrated; however, implementation's herein are not limited to any particular number of portable computing devices 104, or to the particular types of portable computing devices 104 illustrated in FIG. 1. Each portable computing device 104 may be associated with a respective user 106. For instance, a first user 106(1) is illustrated as wearing a first portable computing device 104(1) configured as augmented reality glasses; a second user 106(2) is illustrated as wearing a second portable computing device 104(2) configured as a watch or other wristband type of computing device; and a third user 106(3) is illustrated as carrying a third portable computing device 104(3) configured as a smart phone.

The surrounding environment in this example is an interior space 102, which may be a home, an office, a hospital, a hotel room, an automobile interior, or any other location where it may be desirable to have the surrounding environment automatically adjust to user preferences for the comfort, security and convenience of the user of a portable computing device. In this example, the interior space 102 is divided into three rooms or other type of zones 108. In some cases, the zones may correspond to rooms, and may be defined based on one more wall boundaries. In other case, the zones may be defined based on a radius around a portable computing device, or by other suitable techniques. Thus, the first user 106(1) and the second user 106(2) are in a first zone 108(1) and the third user 106(3) is in a second zone 108(2). In addition, a fourth user 106(4) is located in a third zone 108(3); however, rather than having an associated portable computing device, the fourth user has an identification item 110, such as a radio frequency identification (RFID) tag. For instance, the identification item 110 may be included in any wearable article or may even be permanently attached or implanted into the fourth user 106(4), and may be used to sense the presence of the fourth user 106(4) when the fourth user 106(4) is in any of the zones 108(1)-108(3).

Each zone 108 may include, or may have associated therewith, one or more controllable devices 112, and one or more environment sensors 114. The controllable devices 112 may be any controllable device that affects or otherwise interacts with the environment of the zone, such as, for example, lighting (e.g., overhead lights, table lamps, floor lamps, colored lighting, and natural lighting), climate controls (e.g., thermostat, window controls, ceiling fans, and fireplace), entertainment systems (e.g., music players, television, various different media), appliances (e.g., domestic robots, dishwasher, coffeemaker, pet feeder), security systems (e.g., surveillance cameras, alarms, door locks, garage door controls), and so forth.

Instructions may be sent to the controllable devices 112 for controlling various settings of the controllable devices 112. As one example, the controllable devices 112 may be in communication with one or more networks 116, such as through a wired or wireless connection, using any suitable communication technologies. Additionally, in some examples, the controllable devices 112 may be able to communicate directly with the portable computing devices 104 such as through a close-range radio communication protocol or other suitable communication technologies. For clarity of illustration, only five controllable devices 112(1)-112(5) are illustrated in this example; however numerous other controllable devices may be implemented in other examples according to the techniques herein. Thus, the first zone 108(1) includes a first controllable device 112(1), a second controllable device 112(2), and a third controllable device 112(3). Additionally, the second zone 108(2) includes a fourth controllable device 112(4), and the third zone 108(3) includes a fifth controllable device 112(5).

Each zone 108 may include one or more environment sensors 114. The environment sensors 114 may include various different types of sensors, such as temperature sensors, motion sensors, ambient light sensors, RFID sensors, microphones, cameras, and so forth. The environment sensors 114 may include the ability to communicate with the one or more networks 116, such as through a wired or wireless connection. Additionally, in some examples, the environment sensors 114 may include the ability to communicate with the portable computing devices 104 such as through near-field communications, infrared communications, and so forth.

The one or more networks 116 may include a local area network (LAN), a wide area network (WAN), such as the Internet, or any combination thereof, and may include both wired and/or wireless communication technologies, including Wi-Fi and cellular communication technologies, as well as wired or fiber optic technologies. As one example, the one or more networks 116 may include a network access point 118 such as a wireless router, a network switch, or the like.

The one or more networks 116 may further be in communication with one or more service computing devices 120 that may include one or more modules which, when executed, configure the one or more service computing devices 120 to provide services that include controlling the settings of the controllable devices 112. The service computing device(s) 120 and the portable computing devices 104 may communicate and interact with one another over the one or more networks 116 using any combination of suitable communication and networking protocols, such as Internet protocol (IP), transmission control protocol (TCP), hypertext transfer protocol (HTTP), cellular communication protocols, and so forth. In some examples, the service computing device(s) 120 may include a local service computing device, such as a personal computer or local server, which may also be able to communicate with the portable computing devices 104, the controllable devices 112 and/or the environment sensors 114 by other communication technologies, such as close-range communications, wired communications, etc. In other examples, the service computing device(s) 120 may include one or more cloud-based or otherwise remote servers, such as may be provided by a service providing entity. In still other examples, the service computing devices 120 may include both a local service computing device and one or more remote service computing devices.

Each portable computing device 104 may include one or more communication interfaces (not shown in FIG. 1) to enable the portable computing devices 104 to communicate with the service computing device(s) 120 and with each other through the one or more networks 116 and/or via other communication technologies. For example, the portable computing devices 104 may be able to communicate with each other, the service computing devices 120, the environment sensors 114, and/or the controllable devices 112 through one or more of the Internet, cable networks, cellular networks, local wireless networks (e.g., Wi-Fi), close-range wireless connections (e.g., Bluetooth®, Bluetooth® 4.0 Low Energy, Wi-Fi Direct, IrDA or other infrared communication), near field communications (e.g., NFC RFID), wired networks, and direct wired connections (e.g., USB, Apple Lightning®, HDMI®, Thunderbolt®), or any other suitable communication technology. For instance, in some examples, the portable computing devices may support acoustic-based data transfer. Thus, one or more of radio-signal-based data transfer, light-based data transfer, acoustic-based data transfer, or any other suitable communication technology may be used for inter-device communication.

Additionally, the network access point 118 may also serve as a sensor for determining the proximity of the portable computing device 104 to one of the zones 108 in the surrounding environment. For example, signal strength of a communication signal received from the portable computing device 104 may indicate the zone 108 in which the portable computing device 104 is currently located. Furthermore, the controllable devices 112 may also include communication interfaces that are able to detect communications with the portable computing device 104 and which may provide information as to the zone 108 in which the portable computing device 104 is located.

Additionally, in some examples, some or all of the portable computing devices 104 may include built-in identification items 110, such as RFID tags, to enable identification of the portable computing devices 104 as being in a particular zone 108 using RFID technology. Alternatively, some of the users 106 may have identification items 110 in addition to portable computing devices 104. Further, as another example, facial recognition, body recognition, or other user recognition technology, may be used to determine a current zone 108 of the users 106, in addition to, or as an alternative to, relying on communications from the portable computing devices 104. Numerous other variations will be apparent to those of skill in the art having the benefit of the disclosure herein.

As one example, suppose a user 106 having a portable computing device 104 enters into one of the zones 108. One of the environment sensors 114 in the zone 108 may detect that the portable computing device 114 has entered the zone 108. For instance, a motion detector included in the environment sensors 114 may detect motion of the user, which may cause the environment sensor 114 to poll the zone 108 to determine whether a portable computing device 104 is currently present in the zone 108. As one example, the environment sensor 114 may send a radio single to determine an identity of the portable computing device 104. As another example, the environment sensor 114 may send a signal to the service computing device 120 in response to detecting motion in the zone 108, and in response, the service computing device may poll the zone for a portable computing device 104. As still another example, the portable computing device 104 may send a notification to the service computing device 120 upon determining that it has entered a new zone 108. For instance, the portable computing device 104 may determine its own location using one or more onboard sensors, such as a GPS device, a camera, or a communication interface that is able to determine signal strengths from one or more of the environment sensors 114, the network access point(s) 118, or the controllable devices 112. Numerous other techniques for detecting the presence of a portable computing device 104 in a particular zone 108 and/or identifying the portable computing device 104 will be apparent to those of skill in the art having the benefit of the disclosure herein.

In some cases, upon determining that the portable computing device 104 is present in the zone 108 and the identity of the portable computing device 104, the environment sensor 114 may send a message to the service computing device 120 that includes portable computing device information 122. Alternatively, the portable computing device itself may send presence information, such as the portable computing device information 122, to identify itself to the service computing device 120. In some examples, the portable computing device information 122 may include additional information such as one or more preferred user settings for one or more of the controllable devices 112, user attributes, and the like, as discussed additionally below.

A user profile may be established or determined for each user or other entity. For instance, each individual user may have a corresponding user profile that may include settings implicitly determined for the user, settings expressly specified by the user, and other user preferences, as well as attributes of the user, a user setting history, stored biometric sensor information for the user, and various other types of user information. Further, entities other than a user of a portable computing device may have user profiles. For instance, any human, animal or object may have a respective user profile that may be applied to a zone, such as through recognition of an associated identification item 110, or through other recognition techniques. In addition, groups of people, animals or objects may also have their own user profiles in some cases. As another example, each zone may have a default user profile that may be applied when another user is not present in the zone. For instance, the default user profile may be configured to conserve energy, maintain security of the zone, and the like.

The service computing device 120 may include a control module 124 that is executed on the service computing device 120 to control the settings of the controllable devices 112 at least partially in response to determining that a particular portable computing device 104 associated with a particular user 106 is present in a particular zone 108 of the surrounding environment 102. In some examples, the control module 124 may include or may access a settings determination module 126 that may determine settings to be applied to one or more of the controllable devices 112 in response to determining that a particular portable computing device 104 is in a particular zone 108.

The settings determination module 126 may compare the portable computing device information 122 with previously stored portable computing device information 128 to determine an identity of the user and/or a user profile associated with the portable computing device 104. The settings determination module 126 may further determine any expressed or implicit user preferences for the controllable device settings and/or a current detected context for the particular zone 108 and the particular user 106. As one example, suppose that the user 106 has indicated a preference (either expressly or implicitly) for the ambient lighting to be low in the morning and brighter in the afternoon. The portable computing device 104 and/or the environment sensors 114 may include an ambient light sensor that sends an indication of the current brightness of the ambient lighting in the zone 108 to the settings determination module 126. The settings determination module 126 may check one or more settings rules 130, which may include expressed or implicit user preferences, or other default rules for setting the controllable devices 112. Additionally, the settings determination module 126 may also, or alternatively, employ a settings model 132 to determine a current context of the user and/or the zone. The settings determination module may further refer to controllable device information 134 for determining which controllable devices are associated with the zone 108 and the current settings of those controllable devices 112. As discussed additionally below with respect to FIG. 4, the settings determination module 126 may use this information to determine one or more device control instructions 136 to send to one or more of the controllable devices 112.

In some examples, sensor information 138 from one or more sensors (not shown in FIG. 1) included with the portable computing device 104 may be used to control one or more of the controllable devices 112. For instance, the sensor information 138 may relate to a condition or other context of the surrounding environment, such as an ambient temperature, an ambient light level, an audio level, or the like. Additionally, or alternatively, the sensor information 138 may provide information related to a condition or other context of the respective user. Examples of the sensor information 138 may include biometric sensor information to indicate an internal bodily condition of a user, such as heart rate, body temperature, breath rate, perspiration level, blood pressure, blood sugar level, blood enzyme levels, cholesterol levels and other aspects of blood chemistry, and so forth. Further, other sensor information 138, such as accelerometer information and gyroscope information may indicate whether the user 104 is exercising, sitting still, the user's body position, and so forth.

In some examples, the sensor information 138 may be sent continuously or periodically from each portable computing device 104 to the service computing device 120 while the portable computing device 104 is within the interior space 102, or within a threshold distance of the interior space 102 or other surrounding environment. For instance, the biometric sensor information indicating the bodily condition of the user may be sent continuously to the service computing device 120, which is able to use this information to adjust the settings of the various controllable devices 112 based on the updated biometric sensor information or other context information determined from the sensor information 138 provided by each portable computing device 104, as well as the sensor information that may be provided by the environment sensors 114 in each zone 108.

Based on the sensor information 138 received from the portable computing device 104, the settings determination module 126 may determine one or more settings to be applied to one or more of the controllable devices 112 associated with the zone 108. For instance, if the sensor information 138 indicates that the user 106 is exercising, such as walking or running on a treadmill, the settings determination module may determine from the settings rules 130 and/or the settings model 132 to lower the ambient temperature in the zone 108 in which the user is exercising, turn on a ceiling fan, open a window, or the like.

In addition, having two portable computing devices 104(1) and 104(2) in the same zone 108(1) can complicate the setting determination process, such as when the desired settings for the various controllable devices 112(1)-112(3) are not the same between the two respective users 106(1) and 106(2). When the implicit or expressed settings of two users are not the same, the settings determination module 126 may determine that a settings conflict exists. In anticipation of such conflicts between the setting preferences of two or more users, the service computing device(s) 120 may include a conflict resolution module 140 that may apply one or more conflict resolution rules 142 for resolving the conflict. In some situations, the conflict resolution rules 142 may be based at least in part on the type of controllable device 112 over which the conflict exists. For instance, in the case that the controllable device is a fireplace, the settings may be limited to on or off, and therefore, the setting selected may be based on a priority between the users, such as based on a user hierarchy or other context information. As another example, in the case of that the controllable device 112 is a thermostat or other device having a range of settings, averaging the preferred settings or some other mathematical function may be applied to determine a middle to resolve the conflict.

As an example, suppose that the preference of a first user 106(1) is that the ambient room temperature be 71° F. and that the preference of the second user is that the ambient room temperature be 75° F. In some cases, the conflict resolution rule may specify that the ambient room temperature be set to be the average of the two specified temperatures, i.e., 73° F. in this example. As another example, suppose that the second user is elderly or an infant, and less able to tolerate cold, while the first user is not. Consequently, the second user's preference may take priority over the first user's preference, and the conflict resolution rule may specify that the ambient room temperature be set to 75° F. Thus, the conflict resolution rule may be determined based on attribute information about each of the users, such as the age of each of the users, or other information determined about the users, such as based on received biometric sensor information. Accordingly, in some examples the settings module and/or the conflict resolution module may have access to attribute information about each of the user such as age, sex, health conditions, whether parental controls apply, as well as expressed user preferences for room temperature, room lighting, background music, types of entertainment, security system settings, and so forth, for establishing a hierarchy among the users or other priority. Further, if an explicit hierarchy of users exists for one or more zones, or the entire environment, then this hierarchy information may also be employed by the conflict resolution module 140 for establishing and enforcing a priority in the conflict resolution rules 142. For example, if one of the users is a parent and the other is a child, then in some cases the parent may have an explicit hierarchy over the child for some types of controllable devices, such as volume control, and the parent's settings may be given priority over the child's settings.

Further, the conflict resolution module 140 may learn from user responses to the implementation of some conflict resolution rules for changing the rules or generating new rules to be applied to certain users or groups of users. Thus, rather than having the users manually set up a large number of conflict resolution rules for various situations during a initial set up stage, conflict resolution rules 142 may be learned or otherwise established over time based on observed user actions, direct user inputs, and/or determined user attributes. For instance, in the example above, supposed that the conflict resolution module 142 applies an averaging rule to set the thermostat to 73° F. and, subsequently, one of the users changes the setting either manually or using a user interface of the portable computing device 104 to 75° F. If this happens on several occasions, the conflict resolution module 142 may change the conflict resolution rule with respect to these two users 106(1) and 106(2) so that the second user's preference for 75° F. takes priority over the first user's preference. This learning process may be applied to changing or otherwise independently generating numerous other conflict resolution rules 142.

As mentioned above, in some examples, the portable computing device 104 may continuously or periodically provide the sensor information 138 to the control module 124. Consequently, the portable computing device 104 may be configured to stop sending the sensor information 138 when the user 106 leaves the surrounding environment, such as to ensure the privacy of the user in public locations. For instance, the portable computing device 104 may be configured to stop sending the sensor information 138 when the portable computing device 104 determines that it is located a threshold distance from the interior space 102 or other surrounding environment, such as a threshold distance from the home of the user, office of the user, etc. Furthermore, in some examples, the portable computing device 104 may store the biometric sensor information and other sensor information 138 such as for a predetermined period time e.g., for the past week, past month, etc. This stored biometric sensor information may be subsequently provided to a doctor, hospital etc., by the user 106 such as when seeking treatment for a bodily condition. In some examples, the stored biometric sensor information may be protected by encryption technology such as using a public key-private key pair or other suitable encryption technology that may be implemented to protect the privacy of the user 106 of the portable computing device 104.

Alternatively, in other examples, the user may elect to provide the sensor information 138 and/or portable computing device information 122 to surrounding environments in public locations as well. For example, public or semi-public locations, such as retail shops, restaurants, hospital rooms, hotel rooms, and so forth, may be able to accommodate user preferences for one or more controllable device settings on behalf of the user, such as ambient temperature settings, lighting settings, background music preferences, or the like.

As one example, suppose that the user 106 having the portable computing device 104 enters a retail store that includes a service computing device 120. The service computing device 120 may receive portable computing device information 122 and/or sensor information 138 from the portable computing device 104. For instance, the portable computing device information 122 may include one or more expressed user preferences for certain settings of controllable devices in the retail store, such as for preferred ambient temperature, preferred ambient lighting, preferred type of background music, and so forth. Based on the user preferences included with the portable computing device information 122 or based on the sensor information 138, the service computing device of the retail store may adjust the settings of one or more controllable devices in the retail store to accommodate the preferences of the user or the current biometric readings of the user. For example, the service computing device 120 of the retail store may change the background music to play a particular type of music expressed as a preference of the user, may change the lighting to a preferred coloration of the user, etc. As another example, if the biometric readings of the user indicate that the user has been exercising, the service computing device may lower the ambient temperature, turn on a ceiling fan, and so forth. Further, when multiple users are in the same location, conflicts may be resolved, as discussed above, by the conflict resolution module 140, such as based on conflict resolution rules 142. Additionally, the retail shop may have its own default user profile that may normally be applied, and conflicts between the default user profile and the user profiles of one or more shoppers may be resolved based on various conflict resolution rules, as discussed herein.

Further, as another example, settings of controllable devices in an automobile or other vehicle may be controlled using techniques similar to those discussed above. For example, when a first user 106(1) gets into the driver seat or other interior space of the vehicle, one or more sensors in the automobile may detect the presence of the first user 106(1), such as based on detecting the presence of the portable computing device 104(1) of the first user 106(1), based on detection of an identification item 110, or based on user recognition of the first user 106(1). Various settings of the automobile may then be adjusted to the expressed or learned preferences of the first user such as preferred seat, steering wheel and rearview mirror position, preferred radio station, preferred suspension settings, and so forth.

In addition, as discussed above, not all users 106 may have portable computing devices 104. For example, the fourth user 106(4) may have an identification item 110, such as an RFID tag or other detectable identifier. Alternatively, the environment sensors 114 and/or the service computing device(s) 120 may include a facial recognition, body recognition, or other user recognition capability. Accordingly, when a particular user 106 enters into one of the zones 108, the settings of the controllable devices 112 in that zone 108 may be adjusted to accommodate the particular user 106 based on determining that the particular user 106 has entered into the zone. Thus, when the fourth user 106(4) enters into the third zone 108(3), the environment sensors 114(3) may send a signal to the service computing device 120 including identifying information that enables the service computing device 120 to identify the fourth user 106(4) as being present in the third zone 108(3). In response, the settings determination module 126 may perform a procedure similar to that discussed above upon recognition of a user in a zone 108, and may determine device control instructions 136 for controlling the settings of the controllable device 112(5) associated with the zone 108(3).

In some examples, the identification item 110 may be an RFID tag. The RFID tag may include a write-once-read-many area for maintaining permanent or fixed information. Additionally, in some cases, the RFID tag may include a rewritable area for maintaining rewritable information, such as user preferences for controllable device settings of one or more controllable devices 112. For example, the fixed information may include basic user identification information, such as user's name, a user ID, an RFID tag serial number, a user account identifier, and/or various other types of permanent user information or information that can be used to identify the user. On the other hand, the rewritable information may include setting information or other user preference information for the controllable devices 112 that may change over time. Further, in other examples, the identification item 110 may merely include fixed information and/or the identification item 110 may include other types of technology, such as a barcode, a magnetic strip, and so forth.

In addition, suppose that the fourth user 106(4) enter enters the first zone 108(1) while the first user 106(1) and the second user 106(2) are still in the zone 108(1). Upon determining that the fourth user 106(4) has entered the first zone 108(1), the settings determination module 126 may determine whether any settings of the controllable devices 112(1)-112(3) should be adjusted to accommodate the presence of the fourth user 106(4). In some cases, such as in the case that fourth user 106(4) is identified by an RFID tag, the settings to be applied to the surrounding environment for the fourth user 106(4) may be read from the RFID tag of the fourth user. In other examples, the settings may be saved in a storage location of the service computing device 120. Further, during determination of the settings for the fourth user 106(4), the conflict resolution module 140 may be used to resolve any conflicts between the settings for the first user 106(1), the second user 106(2), and the fourth user 106(4).

As one example, suppose that the fourth user 106(4) is a child or infant and that one of the controllable devices 112(1) is a home entertainment system that includes parental control capability. Further, suppose that the first user 106(1) and second user 106(2) are currently watching an R-rated movie that is unsuitable for viewing by the fourth user 106(4). Consequently, when the service computing device 120 determines that the fourth user 106(4) has entered the first zone 108(1), the conflict resolution module 140 may apply the conflict resolution rules 142, which may include a rule that parental controls should be applied when the fourth user is present, and that the parental controls should override the setting preferences of the first and second users indicating that parental controls do not need to be applied. Consequently, the control module 124 may send device control instructions 136 to the controllable device 112(1) to pause or turn off the movie while the fourth user 106(4) is determined to be present in the first zone 108(1). Should the first user 106(1) or the second user 106(2) determine that the presentation of the movie can continue, one of these users may provide a user input to override the setting determined by the settings determination module 126 and the conflict resolution module 140. For example, the first user 106(1) or the second user 106(2) may make a manual input to a user interface presented by the respective computing device 104, as discussed additionally below, may make a verbal command that is detected by a microphone of the portable computing device 104 or the environment sensors 114, or may manually change a control of the controllable device 112(1), such as with a remote control or using a control on the controllable device 112(1) itself.

As another example, the system 100 may be used to monitor the whereabouts of a particular user 106, such as an infant or child. As discussed above, the system may recognize the location of the child in one of the zones 108 such as based on the presence of the identification item 110, or based on user recognition techniques, such as facial recognition, body recognition etc. A parent may establish that the child should be present in one or more particular zones 108 during one or more specified time periods. Consequently, the management module 124 may be configured to send a notification to the parent when the child is not located in one of the particular zones 108 during the specified time period.

Additionally, a lag-time or other type of hysteresis may be applied in some implementations when changing the settings of some controllable devices. For instance, if a user 106 is merely passing through a particular zone 108, it may be undesirable for the settings of certain types of controllable devices 112 to be changed. As one example, suppose that the first user 106(1) is in the first zone 108(1) when the second user 106(2) enters. The control module 124 may wait for a threshold period of time, or may check other context information for the second user 106(2) before determining how to change the settings for certain types of controllable devices 112, such as thermostats, lighting, entertainment, etc. Thus, if the second user 106(2) remains in the first zone 108(1) for more than the threshold period, or if other context information indicates that the second user intends to stay in the first zone 108(1) (e.g., the second user sits down in a chair), then the control module 124 may begin to adjust the temperature, lighting, etc., according to any conflict resolution rules. As another example, where the controllable device includes lighting, the user 106 may be detected as approaching a zone 108 that is currently unoccupied, and the lights in the zone 108 may be turned on as the user approaches the zone 108. The lights may be subsequently turned off again with little time lag if the user passes through and exits the zone 108.

Similarly, if the control module 124 receives sensor information indicating that the second portable computing device 104(2) has been removed from the first zone 108(1), while the first portable computing device 104(1) remains in the first zone 108(1), this may indicate that the second user 106(2) has departed from the first zone 108(1), while the first user 106(1) remains in the first zone 108(1). The control module 124 may wait until a threshold period of time has elapsed following the departure of the second user 106(2), or may check other user context information before changing one or more settings to conform to the user profile of the first user 106(1). For example, if context information indicates that the second user 106(2) has gone to the kitchen to grab a snack and will likely be going back to the first zone 108(1), the settings on the controllable devices 112(1)-112(3) in the first zone 108(1) may not be changed. However, following elapse of a threshold period of time or receipt of other context information (e.g., the second user is lying down in another zone), the control module 124 may change the settings for one or more of the controllable devices 112(1)-112(3) to the settings corresponding to the user profile of the first user 106(1), who remains in the first zone 108(1).

Additionally, the hysteresis may not be applied to all types of controllable devices 112 or in all situations. For instance, in the parental control example mentioned above, the parental controls may be applied to stop playing the R-rated movie as soon as the child enters the first zone, or may be applied even earlier, such as when the child is detected in the second zone 108(2) and detected movement of the child indicates that the child is likely to be heading toward the first zone 108(1) in which the R-rated movie is currently being presented. Additionally, different threshold periods of time may be applied to different types of controllable devices. Numerous other variations and applications will be apparent to those of skill in the art having the benefit of the disclosure herein.

Figure 2:
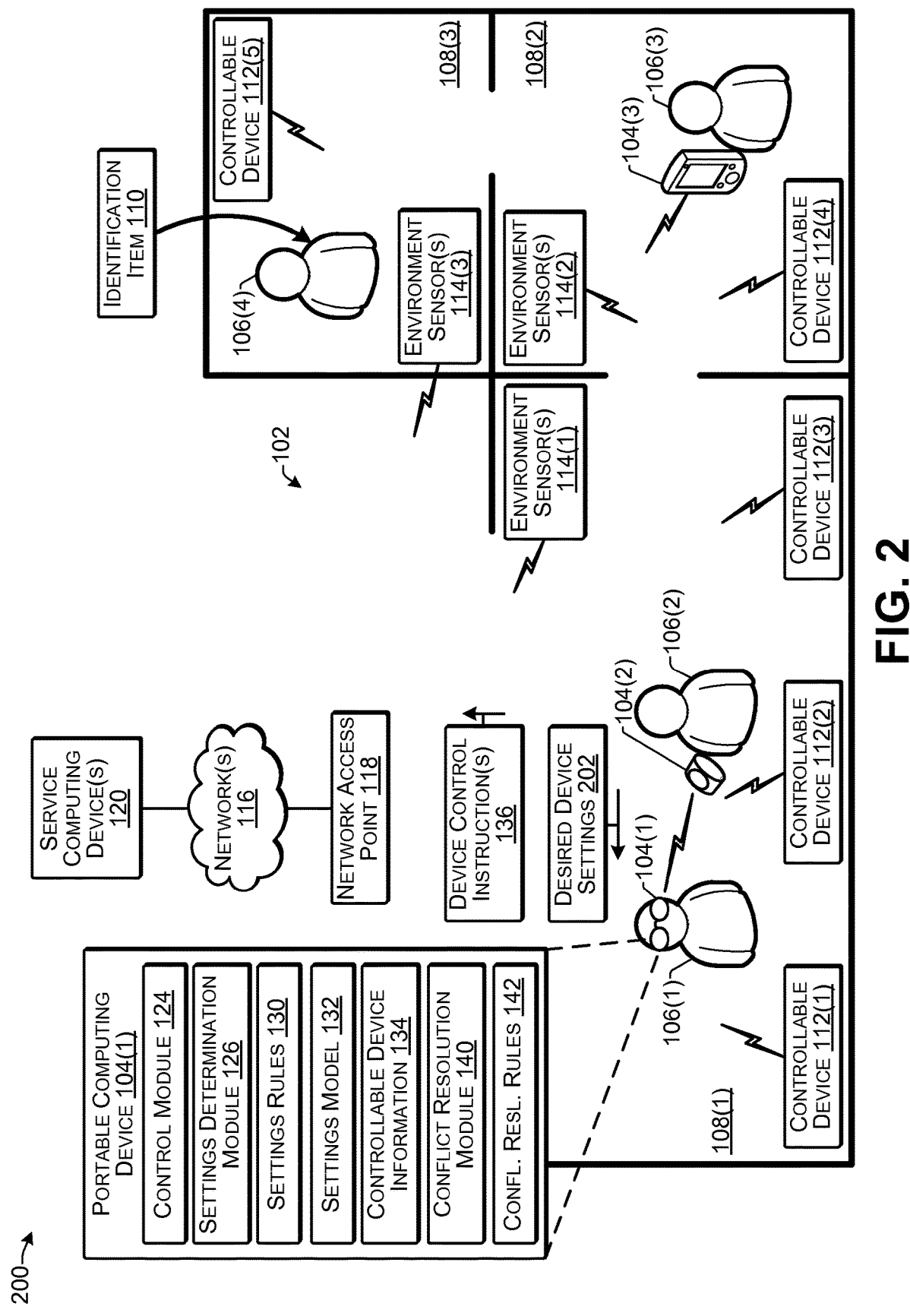
FIG. 2 illustrates an example system configured for controlling a surrounding environment based on interaction with one or more portable computing devices according to some implementations.

FIG. 2 illustrates an example system 200 for controlling a surrounding environment based on interaction with one or more portable computing devices 104 according to some implementations. In the example of FIG. 2, one or more of the portable computing devices 104 may include the control module 124, the settings determination module 126, the settings rules 130, the settings model 132, the controllable device information 134, the conflict resolution module 140, and the conflict resolution rules 142, in addition to, or as an alternative to, these elements being included in the service computing devices 120. In some cases, only one of the portable computing devices 104 may include these elements, while in other cases a plurality of the portable computing devices 104 may include some or all of these elements. Further, in some examples, the service computing device(s) 120 may be eliminated from the system 200.

In some implementations, each portable computing device 104(1)-104(3) may interact directly with the controllable devices 112 in the surrounding environment, such as by sending device control instructions 136 to one or more of the controllable devices 112. For instance, the portable computing devices 104 may communicate with the controllable devices 112 via the one or more networks 116 or by direct communication with particular controllable devices 112 through any of the communication techniques discussed above. Additionally, in some cases the environment sensors 114 may sense a presence of users without portable computing devices 104, such as the user 106(4), through the identification item 110 or through other recognition techniques as discussed previously. In such cases, a service computing device 120 may still be employed, or one of the portable computing devices 104 may act in place of the service computing device 120 for performing the functions for controlling the controllable devices in the environment.

Furthermore, when multiple portable computing devices 104 are present in a particular zone 108 of the interior space 102, the multiple portable computing devices 104 may resolve any conflicts among themselves. In the illustrated example of FIG. 2, the first portable computing device 104(1) and the second portable computing device 104(2) are located in the same first zone 108(1). Consequently, a conflict could occur between device control instructions 136 issued by the multiple portable computing devices 104(1) and 104(2). As one example, suppose that the first user 106(1) having the first portable computing device 104(1) is already in the first zone 108(1) when the second user 106(2) having the second portable computing device 104(2) enters the zone 108(1). Communication may be established between the first portable computing device 104(1) and the second portable computing device 104(2) using any of the techniques discussed above, such as by direct communication or polling, notification from the environment sensors 114(1), or any other suitable communication technique. As one example, the control module 124 on the first portable computing device 104(1) may communicate with the corresponding control module 124 on the second portable computing device 104(2) for establishing one of the portable computing devices 104 as the primary or managing portable computing device 104. For example, the selection of the managing portable computing device may be determined in any of numerous ways, such as based on the first device to enter the zone 108, or a pre-established hierarchy of the users 106 of the portable computing devices 104, such as may be contained in the conflict resolution rules 142 or through any other suitable technique.

In this example, suppose that the first portable computing device 104(1) is established as the managing portable computing device. Accordingly, the second portable computing device 104(2) sends any desired device settings 202 to the first portable computing device 104(1) rather than to the controllable devices 112. The first portable computing device 104(1) may resolve any conflicts between the desired device settings 202 of the second user 106(2) and the desired device settings of the first user 106(1) using the conflict resolution techniques discussed above with respect to FIG. 1. The first portable computing device 104(1) may then send device control instructions 136 to the respective controllable device 112 for setting the controllable device(s) 112 according to the settings determined by the conflict resolution module 140.

In some examples, the second computing device 104(2) may send sensor information to the first portable computing device 104(1), such as for enabling the first portable computing device to determine a context of the second user 106(2) in the manner discussed above. In other examples, the second portable computing device 104(2) may provide its own sensor information to its own control module 124, may determine desired device settings 202 based at least in part on its own sensor information, and may then send the desired device settings 202 to the first portable computing device 104. As still another example, each portable computing device 104(1) and 104(2) may determine its own desired device settings based on its own sensor information, and may send the desired device settings to the service computing device(s) 120, which may resolve any conflicts. Numerous other variations will be apparent to those of skill in the art in light of the disclosure herein.

Figure 3:
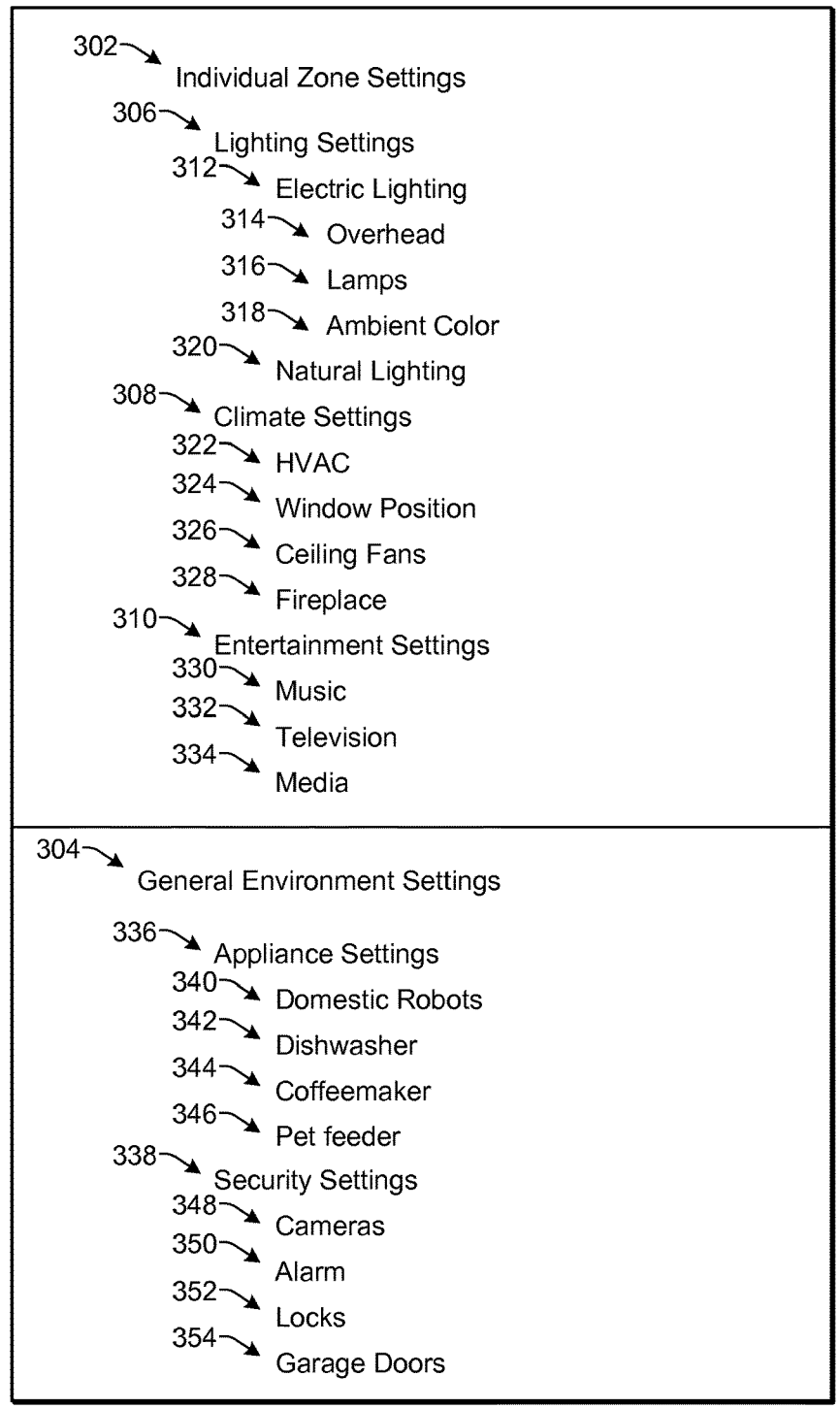
FIG. 3 illustrates an example user interface for controlling settings of controllable devices according to some implementations.

FIG. 3 illustrates an example user interface (UI) 300 that may be accessed by a user 106 of a portable computing device 104 for establishing or changing one or more settings of one or more controllable devices 112. In this example, the UI 300 is divided into individual zone settings 302 and general environment settings 304. For instance, for each individual zone 108 discussed above, various controllable devices 112, if present in, or otherwise associated with, the particular zone 108, may have their settings adjusted via the UI 300. Examples of the controllable devices may include lighting settings 306, climate settings 308 and entertainment settings 310. Examples of electric lighting settings 312 that may be controlled include overhead lighting 314, lamps 316, and ambient color 318 of the lighting. Additionally, in some cases settings for natural lighting 320 may also be controlled such as through powered window shades, electrochromic windows, or the like.

Examples of climate settings 308 include settings for heating, ventilation and air conditioning (HVAC) controls 322, such as thermostats. Additional examples of climate settings 308 may include window position settings 324, ceiling fan settings 326, and fireplace settings 328. Examples of entertainment settings 310 may include music settings 330, such as background music on/off and volume control settings, television settings 332, such as on/off and volume settings, and media selection settings 334, such as for selecting channels, songs, videos, determining media based on parental controls, etc.

Additionally, examples of general environment settings 304 may include appliance settings 336 and security settings 338. For example, appliance settings 336 may include settings for domestic robots 340, a dishwasher 342, a coffeemaker 344, and a pet feeder 346, to name a few. Further examples of security settings 338 may include settings for cameras 348, an alarm 350, door locks 352 and garage doors 354. Further, while several example settings and controllable devices are discussed above, numerous other controllable devices and types of settings will be apparent to those of skill in the art having the benefit of this disclosure.

Figure 4:
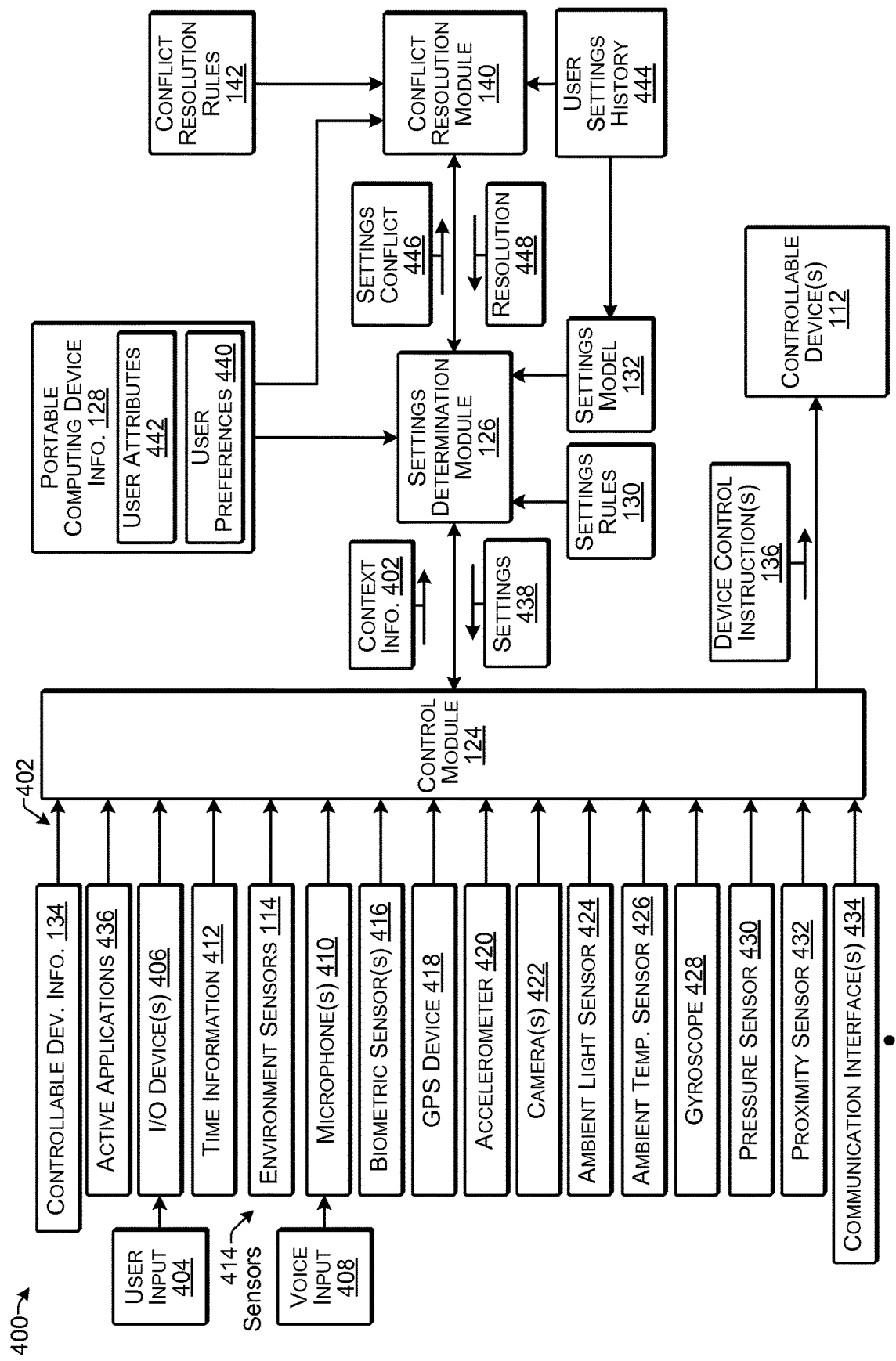
FIG. 4 illustrates an example framework for controlling settings of controllable devices according to some implementations.

FIG. 4 illustrates an example framework 400 for controlling settings of controllable devices according to some implementations. For instance, the framework 400 may be employed using, at least in part, the control module 124 on the one or more service computing devices 120, as discussed above with respect to FIG. 1. Further, in some examples, the framework 400 may be employed using, at least in part, the control module 124 on one or more of the portable computing devices 104, as discussed above with respect to FIG. 2. Further, in some examples, the framework 400 may be employed using control modules 124 on both the service computing device(s) 120 and the portable computing device(s) 104.

The control module 124 may receive context information 402 from a plurality of components, sensors and other sources of information. For instance, in the case that a user wants to change directly the settings of a controllable device 112, the control module 124 may receive user input 404 made through one or more input/output (I/O) devices 406. For instance, a user may provide user input via the UI 300 discussed above with respect to FIG. 3 through any of a touch screen, a mouse, keyboard, keypad, a remote control, a joystick, a trackball, buttons, or any other I/O devices 406 on a portable computing device 104, additional examples of which are enumerated elsewhere herein.

Further, the user input 404 may also include gestures made by the user that are detected by a camera, gesture detection sensor, or the like. For instance, various different gestures may be detected by one or more sensors included with the environment sensors 114 and/or included with the portable computing device 104. As one example, suppose the user is sitting in a chair watching television. The user may use a first gesture, such as raising an arm, to increase the volume of the television, and may use a second gesture, such as lowering the arm to decrease the volume. The one or more cameras may record the gesture as one or more images, send the one or more images to the control module 124, the control module may interpret the images, such as by executing the settings determination module 126, and may send device control instructions 136 to the television to control the television volume in accordance with the detected user input. As another example, such as in the case of a wrist-mounted portable computing device 104, an accelerometer or other sensor on the portable computing device 104 may detect the gesture of the user.

Additionally, or alternatively, the user may make a voice input 408 that is received by one or more microphones 410, such as may be included in the portable computing device 104 or the environment sensors 114. For example, the user may speak a voice command such as "set room temperature lower," to cause the control module 124 to send device control instructions 136 to a thermostat that is one of the controllable devices 112 for lowering the temperature setting of the thermostat for a particular zone. The user input 404 and/or voice input 408 may override any other settings determined by the settings determination module 126 and/or the conflict resolution module 140. The microphone 410 may also be used to assist in detecting a current context of one or more users 106 in a zone 108, such as by detecting sounds that may indicate particular user activities or user conditions. The control module 124 may further receive time information 412, such as from a computer clock, an online source, or the like, to indicate the time of day, the day of the week, the date, the month, the year, etc.

Additionally, the control module 124 may also receive the context information 402 from one or more sensors 414, which may include the environment sensors 114 and/or the sensors included with the portable computing device. Examples of the sensors 414 included in the portable computing device may include user biometric sensors 416 for detecting one or more bodily conditions of the user. Examples of the biometric sensors 416 may include sensors for detecting heart rate, body temperature, breathing rate, perspiration level, blood pressure, blood sugar level, blood enzyme levels, cholesterol levels and other aspects of blood chemistry, and various other sensors for detecting bodily conditions of a user. Additionally, in some examples, the environment sensors 114 may be used to detect bodily conditions, such as body temperature, heart rate, and the like. For instance, the environment sensors 114 may include infrared sensors, electromagnetic sensors, or other types of sensors for detecting various bodily conditions from a distance.

In addition, the sensors 414 included with the portable computing device may include a GPS (Global Positioning System) device 418, one or more accelerometers 420, one or more cameras 422, an ambient light sensor 424, an ambient temperature sensor 426, a gyroscope 428, a pressure sensor 430, and a proximity sensor 432. The GPS device 418 can identify a location of the portable computing device, and can detect movement of the portable computing device from a first location to a second location, such as from a first zone to a second zone. In some examples, the GPS device 418 may be activated only periodically unless movement of the portable computing device has been detected, in which case the GPS device 418 may begin monitoring the direction of travel, velocity of travel, etc. For example, movement may initially be detected by the accelerometer 420, which may then cause activation of the GPS device 418. Further, the accelerometer(s) 420 can be monitored in the background to check for motion that is indicative of certain types of activity or movement of the portable computing device and the user. Various different types of motion, such as gaits, cadence, rhythmic movements, and the like, can be detected by the accelerometer(s) 424 and may be indicative of walking, jogging, running, and so forth. The gyroscope 428 may further indicate motion based on a change in direction of the portable computing device. The proximity sensor 432 may indicate whether the portable computing device or a portion of the portable computing device is near to a surface, such as a hand of a user, a face of a user, a lap of a user, a table or other surface or object, etc.

Further, in some cases, the camera 422 may provide images that can be used to detect a context, such as by determining a location of the portable computing device, an orientation of the portable computing device, a current activity of the user, current lighting conditions in a zone, and so forth. For example, in the case that the portable computing device is an augmented reality device, such as a helmet, goggles or glasses, the portable computing device may have a front-facing camera 422 that is active while the portable computing device is on for detecting various surroundings, objects, controllable devices, lighting, and so forth. Cameras 422 in other types of portable computing devices may be similarly used for determining a current context, if permitted by the user. The ambient light sensor 424 may determine a light level of the environment surrounding the portable computing device. The ambient temperature sensor may determine the current air temperature in a zone in which the portable computing device is located. Further, the pressure sensor 430 may measure an ambient pressure in the zone, which may indicate an altitude of the portable computing device, a surrounding barometric pressure, or the like.

Additionally, one or more communication interfaces 434 of the portable computing device may also function as sensors in some cases. The communication interfaces 430 can indicate a physical location of the portable computing device, such as based on identification of a cell tower, a wireless access point, or the like, that is within range of the portable computing device. For example, a Wi-Fi-based positioning system may be used where GPS is inadequate such as due to signal blockage, or the like. A localization technique used for positioning based on one or more wireless access points can include measuring the intensity of the received signal and/or Wi-Fi "fingerprinting," in which a radio map of a given area or interior space is created based on a probability distribution of signal strength data from one or more access points, and live signal strength values are then compared with the fingerprint. Further, a change in signal strength from a cell tower, wireless access point, or the like, can indicate movement of the portable computing device. Additionally, other types of communication technologies, such as near-field communications and close-range communications may also indicate a position of the portable computing device. In addition, the communication interfaces 434 may communicate with network resources, such as for determining current weather conditions, time of day, and so forth.

Further, the context information 402 may also include other portable computing device information such as any active applications 436 currently active on the portable computing device. For example, if the user is currently using the portable computing device for a particular activity through use of an application, this can indicate a current context for the user and the zone in which the user is currently located. In addition, the context information 402 may include the controllable device information 134. For example, the controllable device information 134 may include a listing of the controllable devices 112 associated with each room or other zone in a surrounding environment, the current settings of the controllable devices 112, the default settings for the controllable devices 112, the possible settings for the controllable devices 112, and so forth, depending on the type or purpose of the individual controllable devices 112.

The control module 124 may send the context information 402 to the settings determination module 126, which may determine one or more settings 438 to be applied to the controllable devices 112 based at least in part on the context information 402 and the controllable device information 134. In addition, when determining the settings 438 for one or more of the controllable devices 112 based at least in part on the context information 402, the settings determination module 126 may also refer to user preferences 440, which may describe user preferences for certain controllable device settings that have been expressed by the user, such as may be made by user input 404 to the UI 300 described above. The settings determination module 126 may also refer to user attributes 442, such as age, sex, bodily condition, and the like, of the user, when determining the settings 438 and/or when resolving conflicts in settings.

To determine the settings 438, the settings determination module 126 may also employ at least one of the settings rules 130 or the settings model 132. For instance, the settings rules 130 may be based on the user preferences 440 or default rules, such as turning off one or more of the controllable devices 112 when there are no users detected in a zone for a threshold period of time. Furthermore, the settings model 132 may be a trained statistical model, or other suitable type algorithm or model, that receives context information 402 from the sensors 414 (e.g., the biometric sensors 416, microphone 410, GPS device 418, accelerometer 420, cameras 422, ambient light sensor 424, ambient temperature sensors 426, gyroscope 428, pressure sensor 430, proximity sensor 432, communication interfaces 434, and so forth), as well as from any user inputs 404, time information 412, active applications 436, etc.

Based on the context information 402, the settings model may determine a current context for the user and/or the zone in which the user is located, such as a current activity of the user in the zone. Based on the determined context, the settings model 132 may determine settings to be applied to one or more controllable devices 112 associated with the zone. For example, the settings model 132 may determine, as a context, a bodily condition of the user, such as whether the user is hot or cold, an activity of the user, such as whether the user is on a treadmill, watching television, playing a game, and so forth. In response to determining the context, the settings model 132 may indicate that the ambient temperature should be adjusted, the ambient lighting should be adjusted, a volume of an entertainment system should be adjusted, a media should be changed, or any of other numerous possible settings should be changed. The determined settings 438 may be provided to the control module 124, which may send the settings 438 as the device control instructions 136 to the controllable devices 112.

The control module 124 may continuously update the context information 402 provided to the settings determination module 126, as the context information 402 is received. For instance, the environment sensors 114, the GPS device 418 and/or the communication interfaces 434 may periodically determine a location of the portable computing device and/or associated user to determine whether the user is still in the same zone. If not, the settings determination module 126 may provide new settings 438 to cause the control module 124 to send additional device control instructions 136 including the new settings 438 to the controllable devices 112, such as for turning off one or more controllable devices 112, changing the ambient temperature setting for conserving energy, etc.

As another example, a camera 422 associated with the portable computing device or the environment sensors 114 may detect that user has turned on a laptop or tablet computing device, turned on a television, etc., and may dim the ambient lighting or close the window shades. Furthermore, the control module 124 may identify one or more active applications 436 that are currently active or executing on the portable computing device, such as being used currently by a user of the portable computing device, or currently displaying an interface on a display of the portable computing device, which may provide an indication of a current use of the portable computing device or an activity of the user. Accordingly, as the user changes activities and/or as changes in biometric readings of the user are detected, the control module 124 may automatically adjust the settings of the zone surrounding the user, such as to increase the comfort of the user, perform tasks for the convenience of the user, and so forth. As one example, suppose that the user has fallen asleep while watching a movie on television. The context information 402, such as biometric sensor information (e.g., heart rate, breathing rate) from the biometric sensors 416, as well as other sensor information (e.g., indicative of a user's body position, lack of motion), may be received by the control module 124 and used to determine that the user has fallen asleep. In response to determining that the user has fallen asleep, various settings may be changed. As several examples, the movie may be paused and/or the volume may be decreased, the lighting may be dimmed or turned off, the ambient air temperature may be lowered, and so forth.

Further, the settings model 132 may include a learning component that may learn preferred settings of a user based on observed or otherwise detected user activity, which may be stored as a user settings history 444. For example, suppose that the user has never provided an express user preference for volume setting for the television in a particular zone, but the context information 402 received over a period of time indicates that the user prefers a volume setting of approximately 10 on a volume scale of 1 to 40. For example, the settings model 132 may average the volume settings used by the user over a period of time, and may establish the average volume setting as an implicit preferred setting for the particular user. Numerous other implicit preferred settings for the various controllable devices 112 may be determined in this manner such that the user does not have to provide express setting preferences unless the user so desires.

Further, the portable computing device 104 may allow some sensors, such as the accelerometer 420, to operate in the background, while other more power-thirsty sensors, such as the GPS device 418 may remain off until some type of movement is detected by the sensors operating in the background. For instance, the accelerometers may provide sensor information that is indicative of a pattern of movement corresponding to walking. The device 100 may then activate the GPS device 418 or other sensors to obtain additional information.

As mentioned above, in some situations, multiple users may be located in the same zone and, in some examples, the control module 124 may receive the context information 402 from multiple portable computing devices and may thereby determine a context about multiple users in the same zone. As one example, the settings determination module 126 may detect a settings conflict when the settings to be applied to a particular controllable device differ between two or more users in the same zone. When the settings determination module 126 detects a settings conflict 446, the conflict resolution module 140 may be executed to generate a resolution 448 in response to the settings conflict 446.

As one example, the conflict resolution module 140 may comprise one or more statistical models, or other types of algorithms or models, that may take into consideration the context information 402, user preferences 440 and user attributes 442 of the users in the same zone, as well as the conflict resolution rules 142 and the user settings history 444. As mentioned above, the conflict resolution module 140 may be able to learn new conflict resolution rules 142 based on the settings change history 448 or new user inputs 404 or 408. For instance, if there is a settings conflict 446 for the volume level of the television, e.g., a first user's implicit preferred volume level is 12 on a volume level scale of 40, while a second user's implicit preferred volume level is 20, the conflict resolution module 140 may average the two settings and set the volume at level 16 as the resolution 448 to the settings conflict 446. Subsequently, should one of the users make a user input 404 or 408 to change the volume setting, such as for changing the volume setting to level 20, the conflict resolution module 140 may store this user input as part of the user settings history 444, and may generate a new conflict resolution rule 142 to the effect that when the first and second users are present in the zone, the second user's volume setting takes priority. Numerous other settings rules 130 and conflict resolution rules 142 may be similarly generated. For example, explicit rules specified by a user may take precedence over implicit rules determined by the settings model 132.

Further, while an average of the two settings is used for resolving the conflict in the example above, other mathematical functions may be used in other examples. For instance, in the situation in which there are three or more users with conflicting settings, a median or mode may be used to resolve the setting conflict, or any other suitable mathematical function. Alternatively, as mentioned previously, in other examples, a hierarchy among the users may be determined, either explicitly based on user inputs, or implicitly based on user attributes, bodily conditions, or the like, and the hierarchy may be applied when determining which settings have priority for a particular controllable device. Additionally, in some examples, each zone may be assigned a default user profile that may include various settings for the controllable devices that are to be applied when no other users are present in the zone. Such settings may include settings for conserving power, locking doors and windows for security, turning on alarm monitoring, and so forth.

Figure 5:
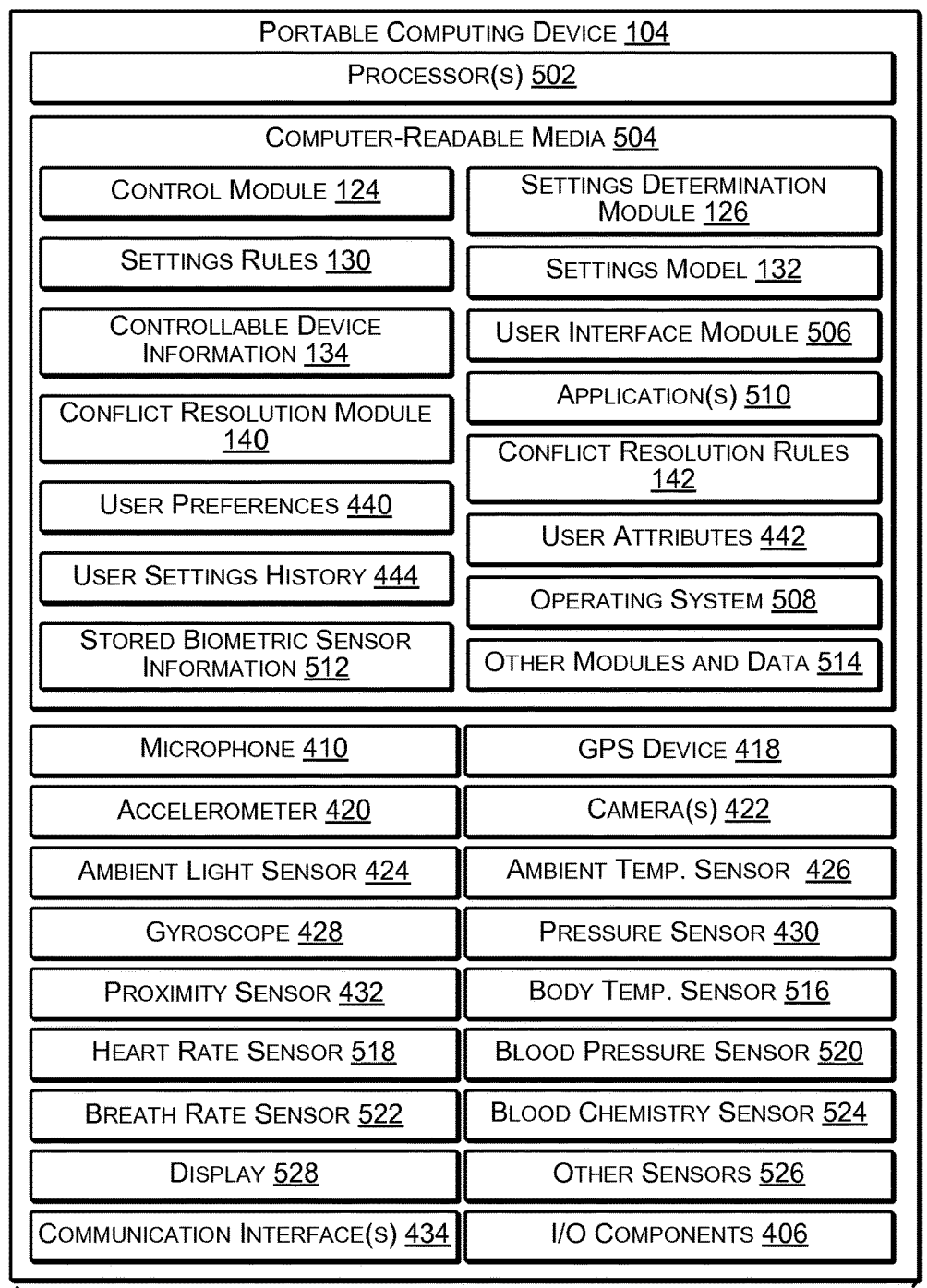
FIG. 5 illustrates select components of an example portable computing device according to some implementations.

FIG. 5 illustrates select example components of an example portable computing device 104 according to some implementations. The portable computing device 104 may be implemented as any of a number of different types of portable computing devices. Some examples of the portable computing devices 104 may include wearable computing devices 104(1), such as computing devices built into articles of clothing, as well as belt-mounted computing devices, watch-type computing devices, wrist-band-type computing devices, or other body-mounted computing devices; augmented reality devices, helmets, goggles or glasses 104(2); digital media devices and eBook readers 104(3); tablet computing devices 104(4); smart phones, mobile devices and portable gaming systems 104(5); laptops, netbooks and other portable computers 104(6), and any other portable device capable of sending communications and performing the functions according to the techniques described herein.

Further, some or all of the portable computing devices 104 herein may provide augmented reality functionality, such as through built-in features and/or through software installed on the portable computing devices. For example, a smart phone, tablet or other portable computing device 104 may be enabled with augmented reality functionality through execution of one or more augmented reality applications or other computer programs on the portable computing device 104. Accordingly, the augmented reality examples herein are not limited to designated augmented reality portable computing devices such as goggles or glasses. As one example, a camera on a portable computing device may be used to obtain one or more images of an area surrounding a user. The portable computing device may provide the user with information, such as identification of individuals, objects, etc., in the area based on analysis of the image.

In a basic configuration, the portable computing device 104 includes, or accesses, components such as at least one processor 502, one or more computer-readable media 504, the one or more communication interfaces 434, and the one or more input/output (I/O) components 406. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable processor-executable instructions stored in the computer-readable media 504.

Depending on the configuration of the portable computing device 104, the computer-readable media 504 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable computing device 104 may access external storage, such as RAID storage systems, storage arrays, network attached storage, storage area networks, cloud storage, or any other medium that can be used to store information and that can be accessed by the processor 502 directly or through another computing device or network. Accordingly, the computer-readable media 504 may be computer storage media able to store instructions, modules or components that may be executed by the processor 502.

The computer-readable media 504 may be used to store and maintain any number of functional components that are executable by the processor 502. In some implementations, these functional components comprise instructions or programs that are executable by the processor 502 and that, when executed, implement operational logic for performing the actions and services attributed above to the portable computing device 104. Functional components of the portable computing device 104 stored in the computer-readable media 504 may include the control module 124, the settings determination module 126, the settings model 132, and the conflict resolution module 140, as discussed above. Further, the functional components may also include a user interface module 506 for presenting the UI 300 discussed above with respect to FIG. 3. Additional functional components may include an operating system 508 for controlling and managing various functions of the portable computing device 104 and for enabling basic user interactions with the portable computing device 104. The computer-readable media 504 may further include one or more applications 510 that may be executed on the portable computing devices 104 for performing various functions and tasks.

In addition, the computer-readable media 504 may also store data, data structures and the like, that are used by the functional components. For example, data stored by the computer-readable media 504 may include the settings rules 130, the conflict resolution rules 142, the controllable device information 134, the user preferences 440, the user attributes 442, the user settings history 444, and, in some examples, stored biometric sensor information 512. Depending on the type of the portable computing device 104, the computer-readable media 504 may also optionally include other functional components and data, such as other modules and data 514, which may include programs, drivers, etc., and the data used by the functional components. Further, the portable computing device 104 may include many other logical, programmatic and physical components, of which those described are merely examples that are related to the discussion herein.

The portable computing device 104 may further include the one or more communication interfaces 434, which may support both wired and wireless connection to various networks, such as cellular networks, radio, Wi-Fi networks, close-range wireless connections, near-field connections, infrared signals, audio signals, local area networks, wide area networks, the Internet, and so forth, examples of which are additionally enumerated above. The communication interfaces 434 may further allow a user to access storage on or through another device, such as the service computing device(s) 120, a network attached storage device, cloud storage, or the like.

The portable computing device 104 may further be equipped with the one or more various I/O components 406. Such I/O components 406 may include speakers, a microphone, and various user controls (e.g., buttons, a joystick, a keyboard, a keypad, a touch screen, etc.), a haptic output device, and so forth. For example, the operating system 508 of the portable computing device 104 may include suitable drivers configured to accept input from a keypad, keyboard, or other user controls and devices included with the I/O components 406.

Other components included in the portable computing device 104 may include various types of sensors, which may include the microphone 410, the GPS device 418, an accelerometer 420, one or more cameras 422, an ambient light sensor 424, an ambient temperature sensor 426, a gyroscope 428, a pressure sensor 430, a proximity sensor 432, and so forth. In addition, the portable computing device 104 may include one or more biometric sensors, such as a body temperature sensor 516, a heart rate sensor 518, a blood pressure sensor 520, a breath rate sensor 522, a blood chemistry sensor 524, and so forth. Numerous other types of sensors 526 may be included on the portable computing device 104, with the foregoing being merely several examples for discussion purposes.

FIG. 5 further illustrates that the portable computing device 104 includes a display 528, which may be passive, emissive or any other form of display. In some cases, the display 528 may be an electronic paper display, such as an electrophoretic or electrowetting display, as mentioned above. Other examples of electronic paper displays may include bi-stable LCD displays, micro electromechanical system (MEMS) displays, such as interferometric modulator displays, cholesteric displays, electrofluidic pixel displays, photonic ink displays, gyricon displays, and the like. In other implementations, or for other types of devices, the display 528 may be an active display such as a liquid crystal display, a plasma display, a light emitting diode display, an OLED (organic light-emitting diode) display, or any other suitable type of display able to present digital content thereon. Accordingly, implementations herein are not limited to any particular display technology. Alternatively, in some examples, the portable computing device 104 does not include a display. Additionally, the portable computing device 104 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 6:
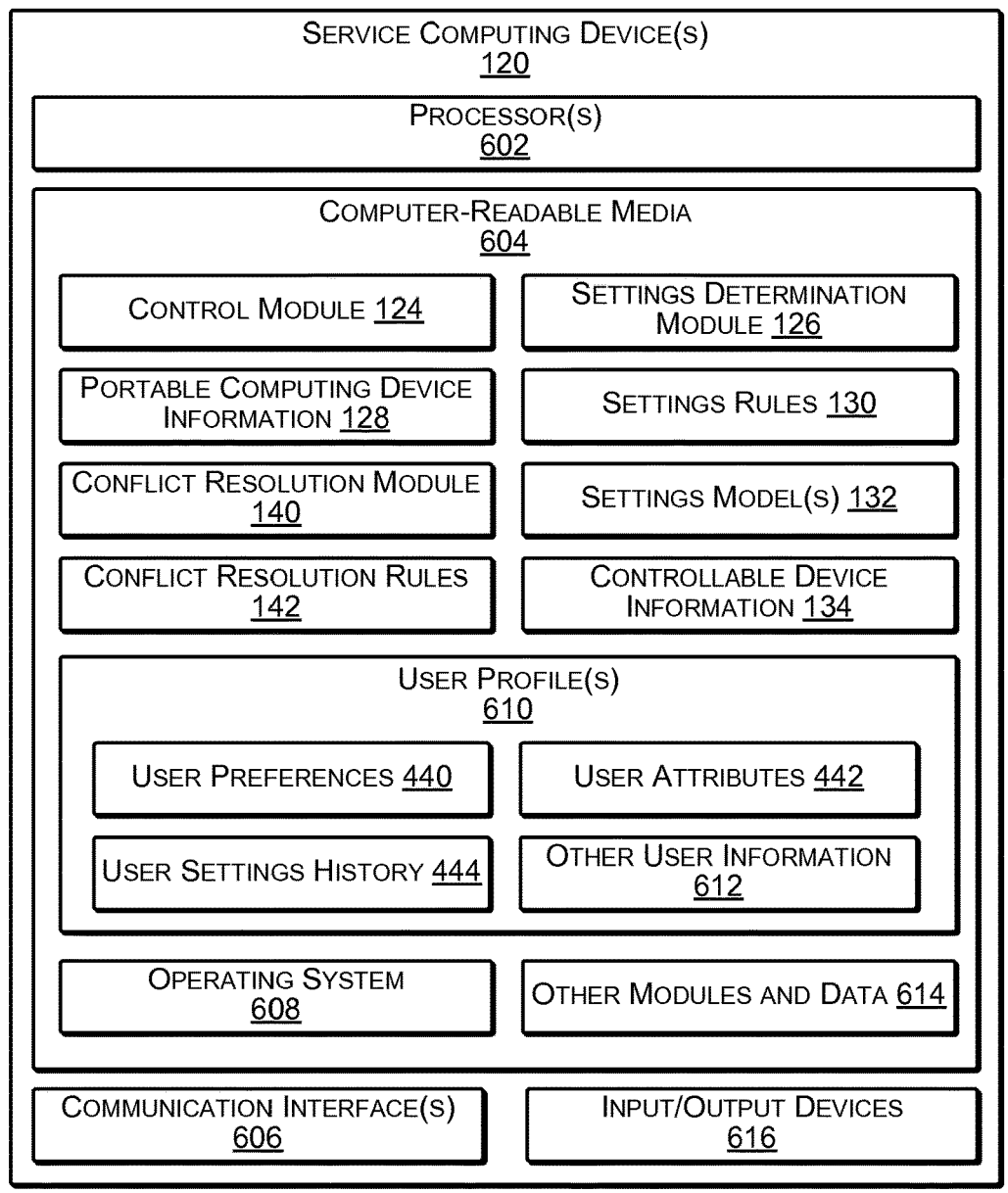
FIG. 6 illustrates select components of an example service computing device according to some implementations.

FIG. 6 illustrates an example configuration of the service computing device(s) 120 according to some implementations. In some examples, the service computing device(s) 120 may be one or more remote servers located at a data center, a server farm, or the like, for providing computing and/or data storage services. In other examples, the service computing device(s) 120 may be a local computing device, such as a personal computer, home server, or the like, configured to manage the controllable devices in a particular home or other surrounding environment. Further, in some examples, the service computing device(s) 120 may include both a local computing device and one or more remote server computing devices. Numerous other possible configurations and architectures will be apparent to those of skill in the art having the benefit of the disclosure herein.

In the illustrated example, each service computing device 120 may include one or more processors 602, one or more computer readable media 604 and one or more communication interfaces 606. Each processor 602 may be a single processing unit or a number of processing units, and may include single or multiple computing units or multiple processing cores. The processor 602 can be implemented as one or more microprocessors, microcomputers, microcontrollers, digital signal processors, central processing units, state machines, logic circuitries, and/or any devices that manipulate signals based on operational instructions. For instance, the processor 602 may be one or more hardware processors and/or logic circuits of any suitable type specifically programmed or configured to execute the algorithms and processes described herein. The processor 602 can be configured to fetch and execute computer-readable processor-executable instructions stored in the computer-readable media 604.

The computer-readable media 604 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the service computing device 120, the computer-readable media 604 may be a type of computer-readable storage media and/or may be a tangible non-transitory media.

The communication interface(s) 606 may include one or more interfaces and hardware components for enabling communication with various other devices, such as the portable computing devices 104 over the one or more networks 116. For example, communication interface(s) 606 may facilitate communication through one or more of the Internet, cable networks, cellular networks, wireless networks (e.g., Wi-Fi, cellular) and wired networks.

The computer-readable media 604 may be used to store and maintain any number of functional components that are executable by the processor(s) 602. In some implementations, these functional components comprise instructions or programs that are executable by the processor(s) 602 and that, when executed, implement operational logic for performing the actions and services attributed to the service computing device 120. Functional components of the service computing device 120 stored in the computer-readable media 604 may include the control module 124, the settings determination module 126, the settings model 132, and the conflict resolution module 140, as discussed above. Additional function components stored in the computer readable media 604 may include an operating system 608 that may manage various tasks of the service computing device 120, and provide basic functionality.

In addition, the computer-readable media 604 may also store data, data structures and the like, that are used by the functional components. For example, data stored by the computer-readable media 604 may include the settings rules 130, the conflict resolution rules 142, the controllable device information 134, the user preferences 440, the user attributes 442, and the user settings history 444. For example, one or more user profiles 610 may include at least one of the respective user preferences 440, user attributes 442, user settings history 444, and other user information 612, such as stored biometric sensor information, for a respective user or other entity. Further, while the one or more user profiles 610 are not shown in the portable computing device example of FIG. 5, the one or more user profiles 610 may also be maintained on the portable computing device 104, such as when the portable computing device 104 manages device settings and conflict resolutions directly. The computer-readable media 604 may also optionally include other functional components and data, such as other modules and data 614, which may include programs, drivers, etc., and the data used by the functional components.

The service computing device(s) 120 may further be equipped with various input/output devices 616. Such I/O devices 616 may include a display, various user interface controls (e.g., buttons, mouse, keyboard, touch screen, etc.), audio speakers, connection ports and so forth. The service computing device(s) 120 may also include many other logical, programmatic and physical components, of which those described above are merely examples that are related to the discussion herein.

Figure 7:
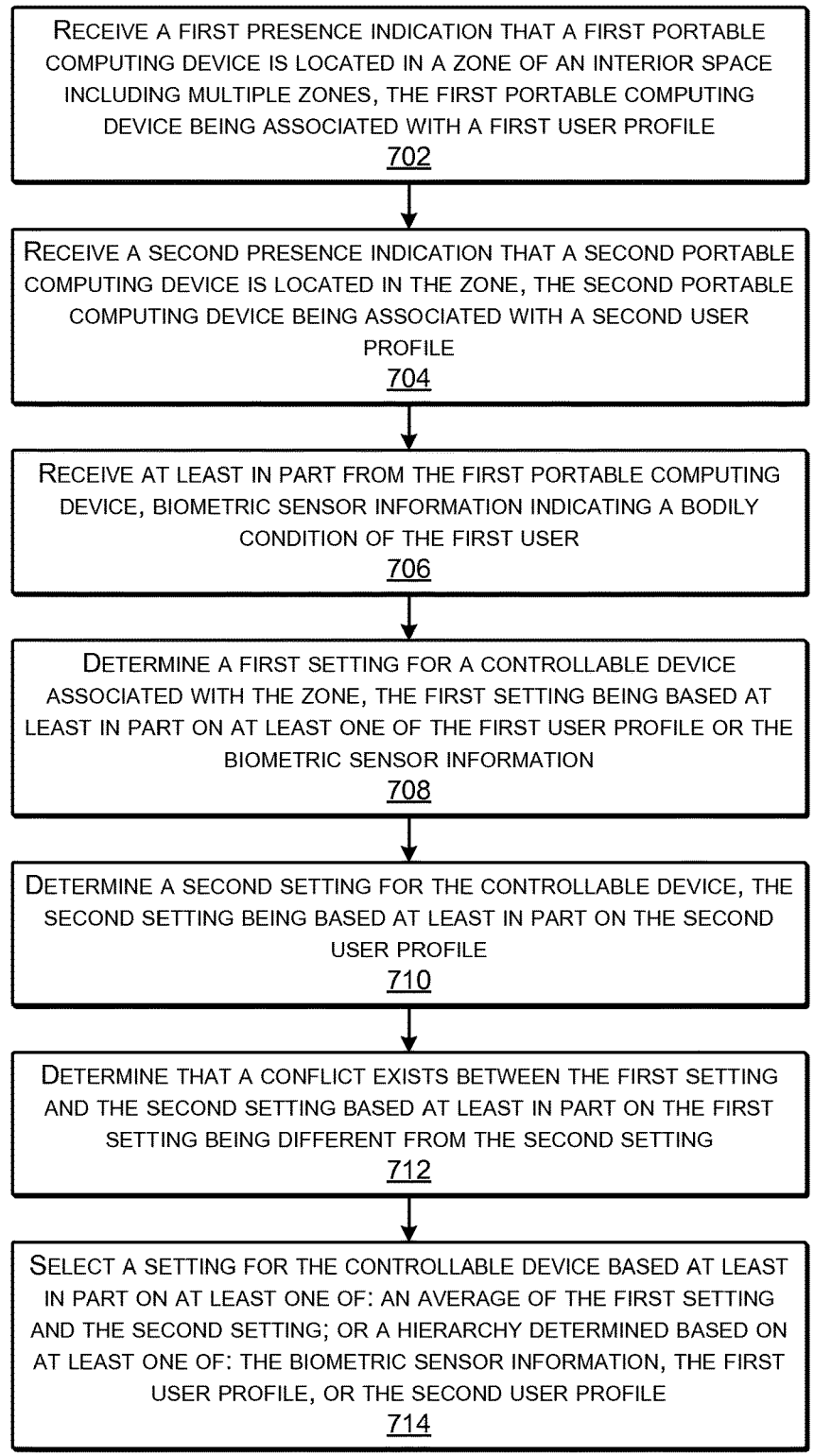
FIG. 7 is a flow diagram illustrating an example process for resolving a settings conflict according to some implementations.
Figure 8:
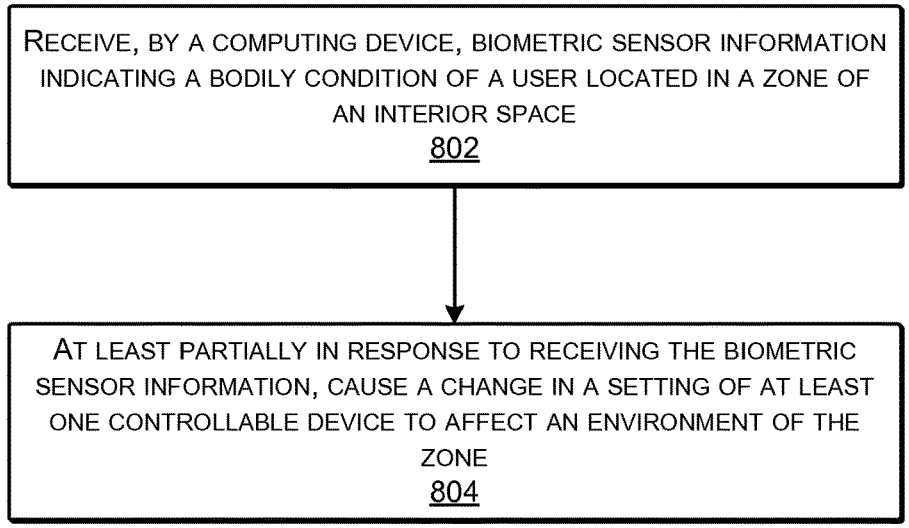
FIG. 8 is a flow diagram illustrating an example process for controlling a controllable device based at least in part on a bodily condition of a user according to some implementations.

FIGS. 7 and 8 illustrate example processes according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and systems described in the examples herein, although the processes may be implemented in a wide variety of other architectures, environments or systems.

FIG. 7 is a flow diagram illustrating an example process 700 for resolving a settings conflict that may be executed, at least in part, by one or more computing devices, such as the service computing device(s) 120 and/or the portable computing device(s) 104 according to some implementations.

At 702, the computing device receives a first presence indication that a first portable computing device is located in a zone of an interior space including multiple zones. For example, the first portable computing device may be associated with a first user profile corresponding to a first user of the first portable computing device, and may be determined to be in the zone using any of the techniques discussed above. As one example, the zone in the interior space may be a room in a house having multiple rooms.

At 704, the computing device receives a second presence indication that a second portable computing device is located in the zone. For example, the second portable computing device may be associated with a second user profile corresponding to a second user of the second portable computing device, and also may be determined to be in the zone using the techniques described above. Accordingly, the computing device may receive presence information for the zone, and the presence information may correspond to a first user profile and a second user profile in this example. Further, in some examples, the first portable computing device and/or the second portable computing device may be wearable computing devices.

At 706, the computing device may further receive, at least in part from the first wearable computing device, biometric sensor information indicating a bodily condition of the first user. For example, the biometric sensor information may be used to determine the bodily condition of the first user, such as at least one of a heart rate of the first user; a body temperature of the first user; a breathing rate of the first user; a blood pressure of the first user; or blood chemistry information of the first user. In some cases, the biometric sensor information may also, or alternatively, be received from the environmental sensors located in the zone.

At 708, the computing device determines a first setting for a controllable device associated with the zone. For example, the first setting may be determined from at least one of the first user profile or the biometric sensor information. For instance, the computing device may use a settings determination module to determine, based at least in part on the first user profile, an explicit or implicit setting preferred by the first user for a controllable device. Further, if the biometric sensor information indicates a particular bodily condition or activity of the first user, this may also be used to determine the first setting for the controllable device in some cases. As one example, the controllable device may be a climate control system and the settings may be temperature settings. Numerous other examples of controllable devices are discussed above.

At 710, the computing device determines a second setting for the controllable device, the second setting being based at least in part on the second user profile. For instance, the second setting may be an implicit or explicit setting preference of the second user for the controllable device determined based at least in part on the second user profile.

At 712, the computing device determines that a conflict exists between the first setting and the second setting based at least in part on the first setting being different from the second setting. For example, when the second setting and first setting are different, the conflict may be resolved by a conflict resolution module.

At 714, the computing device selects a setting for the controllable device based at least in part on at least one of: an average of the first setting and the second setting; or a hierarchy determined based on at least one of: the biometric sensor information, the first user profile, or the second user profile. For example, as discussed above, for some types of controllable devices, the conflict may be resolved by averaging the two settings. In other examples, the conflict may be resolved by determining a hierarchy between the two users, such as based on a user attribute (e.g., age), based on a bodily condition, or based on some other technique, examples of which are give above.

FIG. 8 is a flow diagram illustrating an example process 800 for controlling a controllable device based at least in part on a bodily condition of a user, and that may be executed, at least in part, by one or more computing devices, such as the service computing device(s) 120 and/or the portable computing device(s) 104 according to some implementations.

At 802, the computing device receives biometric sensor information indicating a bodily condition of a user located in a zone of an interior space. For example, the computing device may receive biometric sensor information from one or more biometric sensors included in a portable computing device carried by the user. Receiving the biometric sensor information indicating the bodily condition may include receiving at least one of: a heart rate of the user, a body temperature of the user, a breathing rate of the user, a blood pressure of the user, or blood chemistry information of the user.

At 804, at least partially in response to receiving the biometric sensor information, the computing device may cause a change in a setting of at least one controllable device to affect an environment of the zone. For example, if the biometric sensor information indicates that the user is exercising or feels warm, the computing device may change a setting of a climate control system to lower the ambient air temperature, may turn on a ceiling fan, open a window, or so forth. Additional examples of controllable device settings are discussed above.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by a computing device from one or more sensors, presence information indicating presence of a first user and a second user within a zone;
   identify, based at least in part on the presence information, a first user profile having associated first settings for the first user including a first priority level associated with a first setting corresponding to at least one of the first settings and a second user profile having associated second settings for the second user including a second priority level associated with a second setting corresponding to at least one of the second settings;
   receiving, from one or more sensors of a portable computing device associated with the first user profile, sensor information indicating an amount of light in the zone, and audio sensor information indicating a volume of sound in the zone;
   determining the first setting for a controllable device associated with the zone;
   determining that the second user has remained in the zone at least a threshold period of time;
   determining the second setting for the controllable device, wherein the first setting is different from the second setting;
   determining, based at least in part on a type of the controllable device, one or more conflict resolution rules from a plurality of conflict resolution rules;
   applying the one or more conflict resolution rules to determine a third setting to apply to the controllable device;
   causing the controllable device to change to the third setting;
   after the controllable device is adjusted according to the third setting, receiving an indication that the controllable device has been adjusted to a fourth setting by at least one of the first user or the second user; and
   storing an additional conflict resolution rule based, at least in part, on the fourth setting, the additional conflict resolution rule including an adjustment to at least one of the first priority level associated with the first setting or the second priority level associated with the second setting.

2. The method as recited in claim 1, wherein the determining the third setting to apply to the controllable device is based at least in part on determining an average of the first setting and the second setting.

3. The method as recited in claim 1, wherein the applying the one or more conflict resolution rules to determine the third setting to apply to the controllable device is based at least in part on determining a user attribute from at least one of the first user profile or the second user profile, the user attribute comprising at least one of: a user age; or a user bodily condition.

4. The method as recited in claim 1, further comprising receiving, from one or more biometric sensors of the portable computing device associated with the first user profile, biometric sensor information indicating a bodily condition of a user of the portable computing device, wherein the determining the first setting corresponding to the first user profile is based at least in part on the biometric sensor information.

5. The method as recited in claim 4, further comprising determining, from the biometric sensor information, the bodily condition of the first user including at least one of:
   a heart rate of the first user;
   a body temperature of the first user;
   a breathing rate of the first user;
   a blood pressure of the first user; or
   blood chemistry information of the first user.

6. The method as recited in claim 1, wherein the computing device is a portable computing device associated with the first user profile, the method further comprising determining, by the portable computing device, the setting to apply to the controllable device when the first setting corresponding to the first user profile is different from the second setting corresponding to the second user profile.

7. The method as recited in claim 6, further comprising determining that the first portable computing device determines the setting to apply based on determining a hierarchy from at least one of the first user profile or the second user profile.

8. The method as recited in claim 1, wherein the receiving the presence information for the zone comprises at least one of:
   receiving an indication that the portable computing device is in the zone;
   recognizing an identification item in the zone; or
   recognizing a user in the zone based at least in part on at least one of facial recognition or body recognition.

9. A system comprising:
   one or more processors; and
   a memory that stores one or more computer-executable instructions that are executable by the one or more processors to cause the system to perform operations comprising:
      receiving, by a computing device from one or more sensors, presence information indicating presence of a first user and a second user within a zone;
      identifying, based at least in part on the presence information, a first user profile having associated first settings for the first user including a first priority level associated with a first setting corresponding to at least one of the first settings and a second user profile having associated second settings for the second user including a second priority level associated with a second setting corresponding to at least one of the second settings;
      receiving, from one or more sensors of a portable computing device associated with the first user profile, sensor information indicating an amount of light in the zone, and audio sensor information indicating a volume of sound in the zone;

determining the first setting for a controllable device associated with the zone;

determining that the second user has remained in the zone at least a threshold period of time;

determining the second setting for the controllable device, wherein the first setting is different from the second setting;

determining, based at least in part on a type of the controllable device, one or more conflict resolution rules from a plurality of conflict resolution rules;

applying the one or more conflict resolution rules to determine a third setting to apply to the controllable device;

causing the controllable device to change to the third setting;

after the controllable device is adjusted according to the third setting, receiving an indication that the controllable device has been adjusted to a fourth setting by at least one of the first user or the second user; and storing an additional conflict resolution rule based, at least in part, on the fourth setting, the additional conflict resolution rule including an adjustment to at least one of the first priority level associated with the first setting or the second priority level associated with the second setting.

10. The system as recited in claim 9, wherein the determining the third setting to apply to the controllable device is based at least in part on determining an average of the first setting and the second setting.

11. The system as recited in claim 9, wherein the applying the one or more conflict resolution rules to determine the third setting to apply to the controllable device is based at least in part on determining a user attribute from at least one of the first user profile or the second user profile, the user attribute comprising at least one of: a user age; or a user bodily condition.

12. The system as recited in claim 9, the operations further comprising receiving, from one or more biometric sensors of the portable computing device associated with the first user profile, biometric sensor information indicating a bodily condition of a user of the portable computing device, wherein the determining the first setting corresponding to the first user profile is based at least in part on the biometric sensor information.

13. The system as recited in claim 12, the operations further comprising determining, from the biometric sensor information, the bodily condition of the first user including at least one of:

a heart rate of the first user;
a body temperature of the first user;
a breathing rate of the first user;
a blood pressure of the first user; or
blood chemistry information of the first user.

14. The system as recited in claim 9, wherein the computing device is a portable computing device associated with the first user profile, the operations further comprising determining, by the portable computing device, the setting to apply to the controllable device when the first setting corresponding to the first user profile is different from the second setting corresponding to the second user profile.

15. The system as recited in claim 14, the operations further comprising determining that the first portable computing device determines the setting to apply based on determining a hierarchy from at least one of the first user profile or the second user profile.

16. The system as recited in claim 9, wherein the receiving the presence information for the zone comprises at least one of:

receiving an indication that the portable computing device is in the zone;

recognizing an identification item in the zone; or recognizing a user in the zone based at least in part on at least one of facial recognition or body recognition.

17. The system as recited in claim 9, wherein the first settings and the second settings comprise at least one of:

a setting of lighting in the zone; or an audio volume setting of a controllable device providing audio to the zone.

18. A system comprising:

at least one computing device including at least one processor and one or more computer-readable storage media storing processor-executable instructions executable by the at least one processor to implement one or more services, wherein the one or more services are configured to:

receive, from a sensor within a room of a house, a first presence indication that indicates presence of a first user in the room;

identify a first user profile associated with the first user, wherein the first user profile includes first settings, a first priority level associated with a first setting corresponding to at least one of the first settings, and one or more first attributes associated the first user;

receive, from the sensor, a second presence indication that indicates presence of a second user in the room;

identify a second user profile associated with the second user wherein the second user profile includes second settings, a second priority level associated with a second setting corresponding to at least one of the second settings, and one or more second attributes associated with the second user;

receive, at least in part from a first wearable computing device associated with the first user, sensor information that includes at least one of: biometric sensor information indicating a bodily condition of the first user, light sensor information indicating an amount of light in the room, and audio sensor information indicating a volume of sound in the room;

determine the first setting for a system associated with the room, the first setting based at least in part on the first settings and the sensor information;

determine that the second user has remained in the room for at least a threshold period of time; and at least partly in response to determining that the second user has remained in the room for at least the threshold period of time:

determine the second setting for the system, the second setting based at least in part on the second settings;

determine that a conflict exists between the first setting and the second setting based at least in part on the first setting being different from the second setting;

determine, based at least in part on a type of the system, the one or more first attributes, and the one or more second attributes, one or more conflict resolution rules to resolve the conflict, wherein the one or more conflict resolution rules are determined from a plurality of conflict resolution rules;

apply the one or more conflict resolution rules to determine a third setting for the system;

cause the system to adjust to the third setting;

after the system is adjusted to the third setting, receive an indication that the system has been adjusted to a fourth setting by at least one of the first user or the second user; and generate an additional conflict resolution rule associated with the first user and the second user based, at least in part, on receiving the indication that the system has been adjusted to the fourth setting, the additional conflict resolution rule including an adjustment to at least one of the first priority level associated with the first setting or the second priority level associated with the second setting.

19. The system as recited in claim 18, wherein the one or more services are configured to determine the hierarchy by determining at least one of:

the bodily condition of the first user determined from the biometric sensor information received at least in part from the first wearable computing device; or a user setting history including a value associated with a setting of the system when the first user and the second user were indicated to be in the room.

20. The system as recited in claim 18, wherein the one or more services are further configured to:

receive a third presence indication that a second wearable computing device associated with the second user has been removed from the room; and in response to determining that a second threshold period of time has elapsed since the second wearable computing device was determined to have been removed from the room, cause the system to change to the first setting.

* * * * *